US010074102B2

(12) United States Patent
N et al.

(10) Patent No.: US 10,074,102 B2
(45) Date of Patent: Sep. 11, 2018

(54) PROVIDING ALTERNATE WORDS TO AID IN DRAFTING EFFECTIVE SOCIAL MEDIA POSTS

(71) Applicant: Adobe Systems Incorporated, San Jose, CA (US)

(72) Inventors: Anandhavelu N, Tamil Nadu (IN); Balaji Vasan Srinivasan, Bangalore (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 594 days.

(21) Appl. No.: 14/555,432

(22) Filed: Nov. 26, 2014

(65) Prior Publication Data

US 2016/0147760 A1 May 26, 2016

(51) Int. Cl.
*G06F 17/30* (2006.01)
*G06Q 30/02* (2012.01)
*G06N 5/02* (2006.01)
*G06Q 50/02* (2012.01)

(52) U.S. Cl.
CPC ..... *G06Q 30/0244* (2013.01); *G06F 17/3064* (2013.01); *G06N 5/02* (2013.01); *G06Q 50/02* (2013.01)

(58) Field of Classification Search
CPC .......................... G06Q 30/0244; G06Q 50/02; G06F 17/3064; G06F 17/30637; G06N 5/02
See application file for complete search history.

(56) References Cited

U.S. PATENT DOCUMENTS

| | | | |
|---|---|---|---|
| 9,367,583 B1* | 6/2016 | Bernard | G06F 17/30386 |
| 9,465,435 B1* | 10/2016 | Zhang | G06F 3/01 |
| 2011/0047163 A1* | 2/2011 | Chechik | G06F 17/30781 |
| | | | 707/741 |
| 2013/0046544 A1* | 2/2013 | Kay | G06F 3/04883 |
| | | | 704/275 |
| 2014/0088944 A1 | 3/2014 | Natarajan et al. | |
| 2014/0122622 A1* | 5/2014 | Castera | H04L 51/32 |
| | | | 709/206 |
| 2014/0236673 A1* | 8/2014 | Smith | H04L 67/22 |
| | | | 705/7.29 |
| 2015/0127591 A1* | 5/2015 | Gupta | G06N 99/005 |
| | | | 706/12 |
| 2015/0149896 A1* | 5/2015 | Radhakrishnan | G06F 17/2735 |
| | | | 715/271 |
| 2015/0347925 A1* | 12/2015 | Zeng | H04L 51/30 |
| | | | 706/12 |

* cited by examiner

*Primary Examiner* — Alexander Khong
(74) *Attorney, Agent, or Firm* — Keller Jolley Preece

(57) ABSTRACT

The present disclosure is directed toward systems and methods for increasing an engagement level of a social media post among a community of social media users. For example, systems and method described herein involve building and training a data model that represents how a given community of social media users engages with social media posts. Furthermore, systems and method described herein utilize the trained data model to suggest one or more alternative word choices for use in a social media post, in order to increase or optimize the predicted level of engagement the social media post will receive from the community of social media users.

20 Claims, 8 Drawing Sheets

PROVIDING ALTERNATE WORDS TO AID IN DRAFTING EFFECTIVE SOCIAL MEDIA POSTS

CROSS REFERENCE TO RELATED APPLICATIONS

N/A

BACKGROUND

1. Technical Field

One or more embodiments described herein relate generally to social media marketing. More specifically, one or more embodiments relate to suggesting alternative word selections for use in social media posts.

2. Background and Relevant Art

Social media marketing is a fast growing field that generally provides a good platform for marketers to reach out to potential customers in a cost effective manner. For example, a marketer may utilize social media to post a message advertising a new product to a community of potential customers. In response to the posted advertisement message, the community of potential customers may reply to the marketer in a variety of ways. Thus, by utilizing social media marketing, the marketer may quickly and easily determine how the community of potential customers is receiving the new product.

As such, word choice in social media marketing is typically important. For example, a marketer may submit a social media post to a community of potential customers advertising a company's new "colorful" dish set. This social media post may prompt more engagement from the community of potential customers if the marketer utilizes an alternative word such as, "kaleidoscopic." Such a word substitution may lead to more members in the community of potential customers reading the social media post, "liking" the social media post, re-posting the social media post, and/or replying to the social media post. Similarly, a poor word substitution may lead to members in the community of potential customers to avoid future campaigns from the brand, disregard the social media post, or reply negatively to the social media post.

Accordingly, word choice is one factor that is typically directly tied to the success of a social media marketing campaign. In response to a marketer using a word in an ineffective manner, the community of potential customers may misinterpret a social media post leading to damage of the brand represented in the campaign. Thus, the social media marketer typically puts great effort into crafting a social media post that is designed to strike the right chord with the relevant community.

A social media marketer, however, generally has no indication as to which word choices will increase social media engagement between the community of potential customers and the social media post. For instance, a social media marketer may not understand that a certain community may read sarcasm into a word that is generally only laudatory (e.g., the word "super"). Likewise, a social media marketer generally has no notion as to which words have historically resonated with a certain community. For example, a marketer may not know that a community of bargain shoppers typically disregards social media posts advertising goods that are "super cheap," but regularly engages with social media posts that advertise "big savings."

The importance of word selection is particularly important in the world of social media because social media can spread rapidly. In particular, a post with poor word choice that damages a brand can go "viral" in a matter of minutes. Furthermore, the damage caused by such posts may be difficult or impossible to remedy.

In addition to the foregoing, the ease with which a marketer can post in social media can lead to poor posts that can damage a brand. In particular, the process of producing and deploying an advertisement in traditional print media often prevents poor advertisements because copywriting and printing processes provide for review and multiple sets of eyes on an advertisement. Furthermore, the timing of traditional print processes allows a marketer to rethink or pull an advertisement multiple times. In contrast, the ability to instantly post an advertisement in social media, presents various potential pitfalls that often do not exist with traditional print media.

Thus, current methods of social media marketing include several disadvantages that may lead to ineffective marketing campaigns.

SUMMARY

One or more embodiments described herein provide benefits and/or solve one or more of the foregoing or other problems in the art with systems and methods that provide users with alternate words for drafting a social media post that will resonate with an intended audience. For example, one or more embodiments involve receiving a draft of a social media post with an indication of a query word for which the drafter desires alternative word suggestions. The systems and methods can identify one or more alternative words that have a similar meaning as the query word. The systems and methods can then determine a predicted engagement score for each of the alternative words. The systems and methods can then provide the alternative words and their engagement scores to the user. The user can decide whether to use any of the alternative words based on the provided engagement scores in order to increase the likelihood that members of a given community of social media users will engage with the user's social media post.

In order to determine the engagement scores, systems and methods described herein can track and analyze historical social media post data. The system and methods can then create a predictive model based on the analysis of the historical social media post data. Thus, one or more embodiments can provide a predicted level of social media engagement among a community of social media users based on a single word. For example, by utilizing a predictive model based on the analysis of historical social media post data, the systems and methods described herein may determine whether the substitution of one word for another in a social media post will increase the level of social media engagement the social media post will attract within a given community. Additionally, the systems and methods described herein can identify a list of possible substitutions that will likely increase the predicted engagement for a social media post if substituted for a given word within the post.

Additional features and advantages of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features, a more particular description will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of its scope, various embodiments will be described and explained with additional specificity and detail through the use of the accompanying drawings in which.

DETAILED DESCRIPTION

Figure 1:
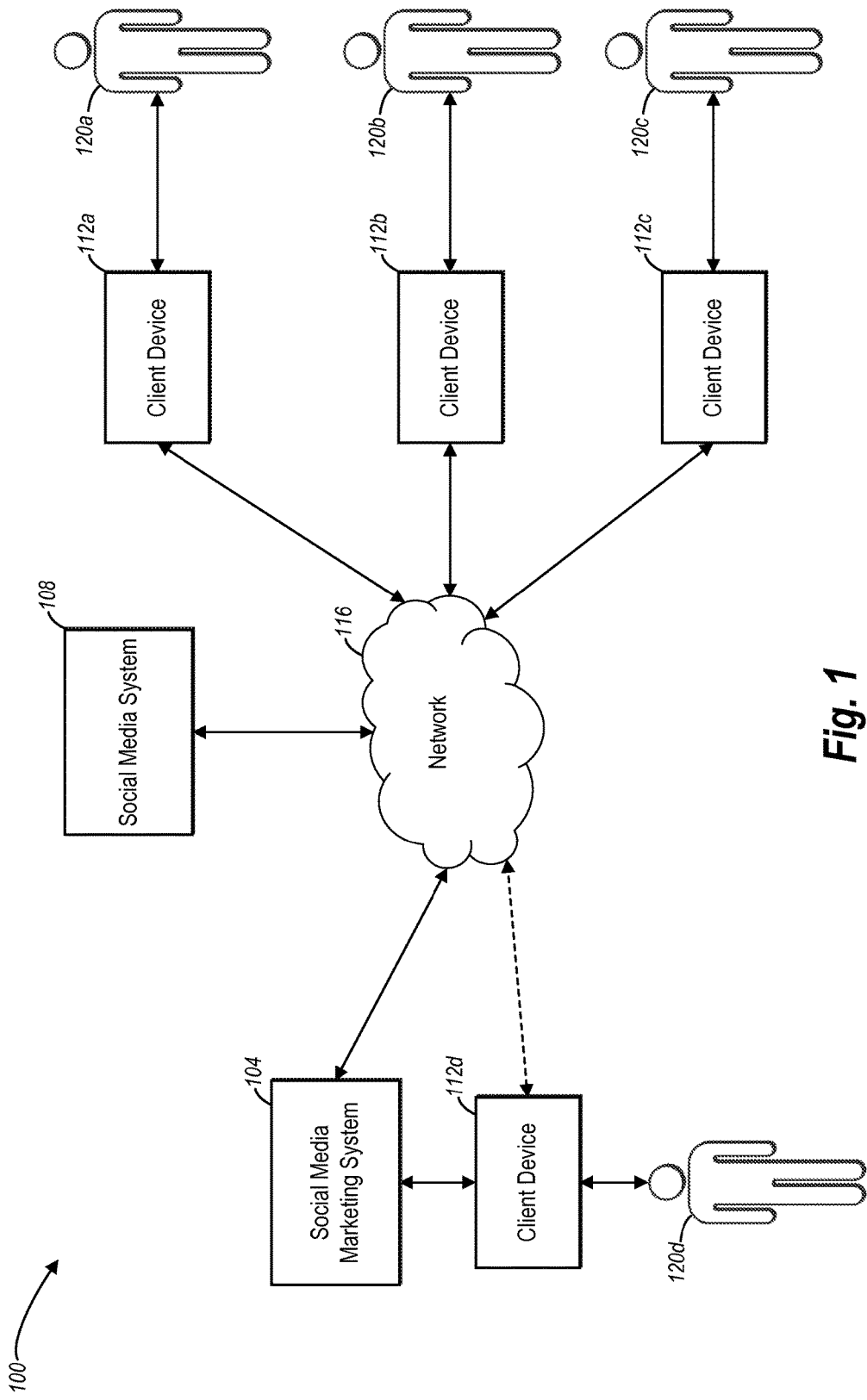
FIG. 1 illustrates a block diagram of an environment for implementing a social media marketing system in accordance with one or more embodiments.

One or more embodiments described herein include a social media marketing system that provides users with alternative word suggestions for increasing or optimizing effectiveness of a social media post. For example, the social media marketing system can provide a list of alternative word suggestions to use in place of one or more words in a social media post. The social media marketing system can provide the list of alternative word suggestions in order to increase or optimize engagement for the social media post. Thus, the social media marketing system can assist in creating social media posts that garner more responses, "likes," re-posts, and other types of engagement among a given community of social media users.

For example, one or more embodiments involve receiving a draft of a social media post with an indication of a query word for which the drafter desires alternative word suggestions. The social media marketing system can identify one or more alternative words that have a similar meaning as the query word. The social media marketing system can then determine a predicted engagement score for each of the alternative words. The social media marketing system can then provide the alternative words and their engagement scores to the user. The user can decide whether to use any of the alternative words based on the provided engagement scores in order to increase the likelihood that members of a given community of social media users will engage with the user's social media post.

To aid in suggesting alternative words, the social media marketing system can track and analyze historical social media post data. The social media marketing system can create a predictive model based on the analysis of the historical social media post data. Thus, in one or more embodiments, the social media marketing system can provide a predicted level of social media engagement among a community of social media users based on a single word. For example, by utilizing a predictive model based on the analysis of historical social media post data, the social media marketing system can may determine whether the substitution of one word for another in a social media post will increase the level of social media engagement. Additionally, the social media marketing system can identify a list of possible substitutions that will likely increase the predicted engagement for a social media post if substituted for a given word within the post.

Specifically, in one or more embodiments, the social media marketing system can build and train the engagement model based on monitored or gathered social media post data. For example, the social media marketing system can gather historical social media posts as well as other meta-data associated with the historical social media posts (i.e., replies, "likes," re-posts, etc.) and determine an engagement level for each post based on the meta-data. Thereafter, the social media marketing system may determine one or more features of each of the historical social media posts and parse each historical social media post into one or more words. The social media marketing system can build the engagement model by associating the engagement level for a historical social media post with each word and feature identified within the post. Thus, the social media marketing system may continually train the model to identify words that cause greater engagement within a community of social media users based on a variety of features.

As used herein, an "engagement level" of a social media post refers to an amount of interaction the social media marketing system detects between social media users and the social media post. For example, interactions between one or more social media users and a social media post can include, but are not limited to "likes," replies, re-posts, shares, etc. The social media marketing system may determine that a social media post with multiple such interactions has a high engagement level. Conversely, social media marketing system may determine that a social media post with replies containing negative language has a low engagement level. Along similar lines, the social media marketing system may determine that a social media post has a neutral engagement level if the social media post has no replies, no "likes," and no re-posts.

The social media marketing system can scale the engagement level determination according to the size of the given community of social media users being analyzed. For example, if the community has 10,000 members, the social media marketing system may not determine a high engagement level for a social media post until the social media post has at least 1,500 "likes." Similarly, if the community has only 500 members, the social media marketing system may determine a low engagement level for a social media post after it receives five replies containing negative language. The social media marketing system may be configured to scale with the given community, or may scale automatically. The social media marketing system can also increase or decrease the engagement level for a social media post based on combinations of interactions (i.e., in a community with 500 members, it may take 50 "likes" to balance out one negative reply).

In one or more embodiments, the social media marketing system can assign a numerical value to a determined engagement level for a social media post. For example, the social media marketing system may assign numbers 0-3 to a social media post with a low engagement level. Similarly, the social media marketing system may assign numbers 4-6 to social media posts with a neutral engagement level, and numbers 7-10 to social media posts with a high engagement level. Alternatively, the social media marketing system may assign numbers ranging from 0-100 to the various engagement levels in order to include more granularity in the determination. As will be described in more detail below, the social media marketing system can utilize these numeric values in building and training an engagement model that represents predicted engagement scores for various words and phrases used in social media posts.

As used herein, an "engagement score" of a word or phrase represents a prediction of how well a certain community of social media users will engage with the word or phrase. For example, as will be described in greater detail below, the social media marketing system can assign an engagement level to a social media post that represents how well a community of social media users has engaged with the social media post. In building an engagement model, the social media marketing system can parse the social media post into its constituent words and phrases, and assign the engagement level for the entire social media post based on each parsed word and phrase. Thus, the engagement level for a given social media post becomes the baseline engagement score for each word and/or phrase within the social media post. Overtime, as the social media marketing system identifies those same words and/or phrases in other social media posts, the social media marketing system can average (i.e., train) the score for those words and/or phrases with the engagement levels determined for the other social media posts. Accordingly, after the social media marketing system trains the engagement model for a given community, the engagement score for each word and/or phrase included in the engagement model represents an average of how well the given community engaged with the word and/or phrase across multiple social media posts.

Thus, as an example, the system can determine that a draft of a social post has a predicted engagement level of 25. The predicted engagement level of 25 can be based on engagement scores for various features of the draft of the social post. For example, the query word can include an engagement score of 8. The system can determine that an alternate word for the query word has an engagement score of 11. Thus, draft of the social media post can have an increased predicted engagement level of 28 if the alternate word is substituted for the query word.

As used herein, the term "social media system" refers to a system that supports or enables on-line communication, input, interaction, content sharing, and collaboration between users. Example social media systems include TWITTER, FACEBOOK, PINTEREST, GOOGLE+, LINKEDIN, etc. The term "social media post" refers to content input or added to a social media system. Example social media posts include user comments, messages, photos, videos, advertisements, sponsored posts, etc. Furthermore, social media posts can include acceptance or agreement of other social media posts such as "likes," "retweets," "pins," etc. In one or more embodiments, a social media post is a post that has been submitted by a user to a social media system, while a draft of a social media post is a post that has been drafted by the user, but not yet submitted to the social media system.

FIG. 1 is a schematic diagram illustrating a system 100 for implementing a social media marketing system 104 in accordance with one or more embodiments. As illustrated in FIG. 1, the system 100 may include users 120a, 120b, 120c, and 120d, client devices 112a, 112b, 112c, and 112d, a social media system 108, a network 116 (e.g., the Internet), and the social media marketing system 104. As further illustrated in FIG. 1, the client devices 112a-112d can communicate with the social media system 108 and the social media marketing system 104 through the network 116. Although FIG. 1 illustrates a particular arrangement of the users 120a, 120b, 120c, 120d, the client devices 112a, 112b, 112c, 112d, the network 116, the social media system 108 and the social media marketing system 104, various additional arrangements are possible. For example, the client devices 112a-112d, may directly communicate with the social media system 108, by passing the network 116.

While FIG. 1 illustrates four users 120a-120d, the system 100 can include more than four users. For example, the system 100 can send and receive data to and from some or all of the users of the social media system(s) 108. Additionally, although FIG. 1 illustrates only one social media system 108, the system 100 can include more than one social media system 108. For example, the social media marketing system 104 may communicate with multiple social networking systems via the network 116.

Furthermore, as shown in FIG. 1, in one or more embodiments the users 120a-120d can interact with the client devices 112a-112d, respectively. In particular, the users 120a-120d can use the client devices to access the social media system 108 or the social media marketing system 108. Examples of client devices include, but are not limited to, mobile devices (e.g., smartphones, tablets), laptops, desktops, or any other type of computing device, such as those described in relation to FIG. 7.

Additionally, in one or more embodiments, the client devices 112a-112d of the system 100 can communicate with the social media system 108 through the network 116. In one or more embodiments, the network 116 may include the Internet or World Wide Web. The network 116, however, can include various other types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Example networks and network features are described below with reference to FIG. 7 below.

The client devices 112a, 112b, 112c, and 112d of FIG. 1 can also send and receive social media posts by way of the social media system 108. For example, a social media application can run on each client devices 112a, 112b, 112c, and 112d. The social media application can allow the client devices to communicate with the social media system 108. The social media application can receive inputs from a user via any of the client devices 112a-112d (e.g., such as through a touch screen) to allow the users 120a-120d to input text, or other types of media, for use in social media posts. Thus, in one or more embodiments, a user can send social media posts to social media applications of other users via the social media system 108.

The social media system 108 can post the social media posts (whether text or otherwise) to a social media graphical user interface (or "wall") of one or more users of the social media system 108. For example, one or more embodiments may present the users 112a, 112b, 112c, and 112d with a social media wall including social media posts from one or more co-users associated with the users 112a, 112b, 112c, and/or 112d via the social media system 108. In one or more embodiments, each of the users 120a-120d may scroll through their social media wall in order to view recent social media posts submitted by the one or more co-users associated with the users 120a, 120b, 120c, and/or 120d via the social media system 108. In one embodiment, the social media system 108 may organize the social media posts chronologically on a user's social media wall. In alternative embodiments, the social media system 108 may organize the social media posts geographically, by interest groups, according to a relationship coefficient between the user and the co-user, etc. Additionally, in one or more embodiments, the users 120a, 120b, 120c, 120d may download a copy of their social media walls as a record of the social media posts.

Additionally, one or more embodiments allow the social media system 108 to transmit social media posts between the users 120a, 120b, 120c, and 120d. For example, in response to the user 120a submitting a social media post, the social media system 108 may update the social media wall of the users associated with the user to include the social media post submitted by the user 120a. Alternatively, the social media system 108 may similarly transmit social media messages between two of the users as a private conversation. As used herein, a "social media message" is a message between two users. In contrast, as used herein, a "social media post" is a post from one user for transmission to a group of users or every co-user associated with the user via the social media system 108.

In one or more embodiments, the client device 112d can allow a marketer 120d to interact with the social media marketing system 104. As described below, the marketer 120d can provide a social media post to the social media marketing system 104. The social media marketing system 104 can then provide alternative words for use in the social media post provided by the marketer 120d. The alternative words provided by the social media marketing system 104 can increase the odds that users engage or are otherwise positively affected by the social media post.

In one or more embodiments, the social media marketing system 104 may monitor, track, review, or otherwise "listen" to social media posts and/or messages sent amongst the users 102a, 102b, 102c via the social media system 108. For example, the social media marketing system 104 may monitor a social media post submitted by the user 102a. In some embodiments, the social media system 108 may provide access to the social media marketing system 104 prior to transmitting a submitted social media post or message to other users 102a, 102b, and 102c. Alternatively, the social media system 108 may transmit a submitted social media post to the social media marketing system 104 at the same time that the social media system 108 transmits the submitted social media post to the users 102a, 102b, and 102c.

Additionally, in one embodiment, the social media system 108 may require the social media marketing system 104 to be associated as a co-user of the user 102a before the social media system 108 may allow access to the social media post by the social media marketing system 104. For example, the social media marketing system 104 can maintain an account and/or profile associated with the social media system 108. In one or more embodiments, the social media system 108 can transmit the social media posts (whether text or otherwise) from the users 120a, 120b, 120c, and 120d directly to the social media marketing system 104 for analysis and storage.

Figure 2:
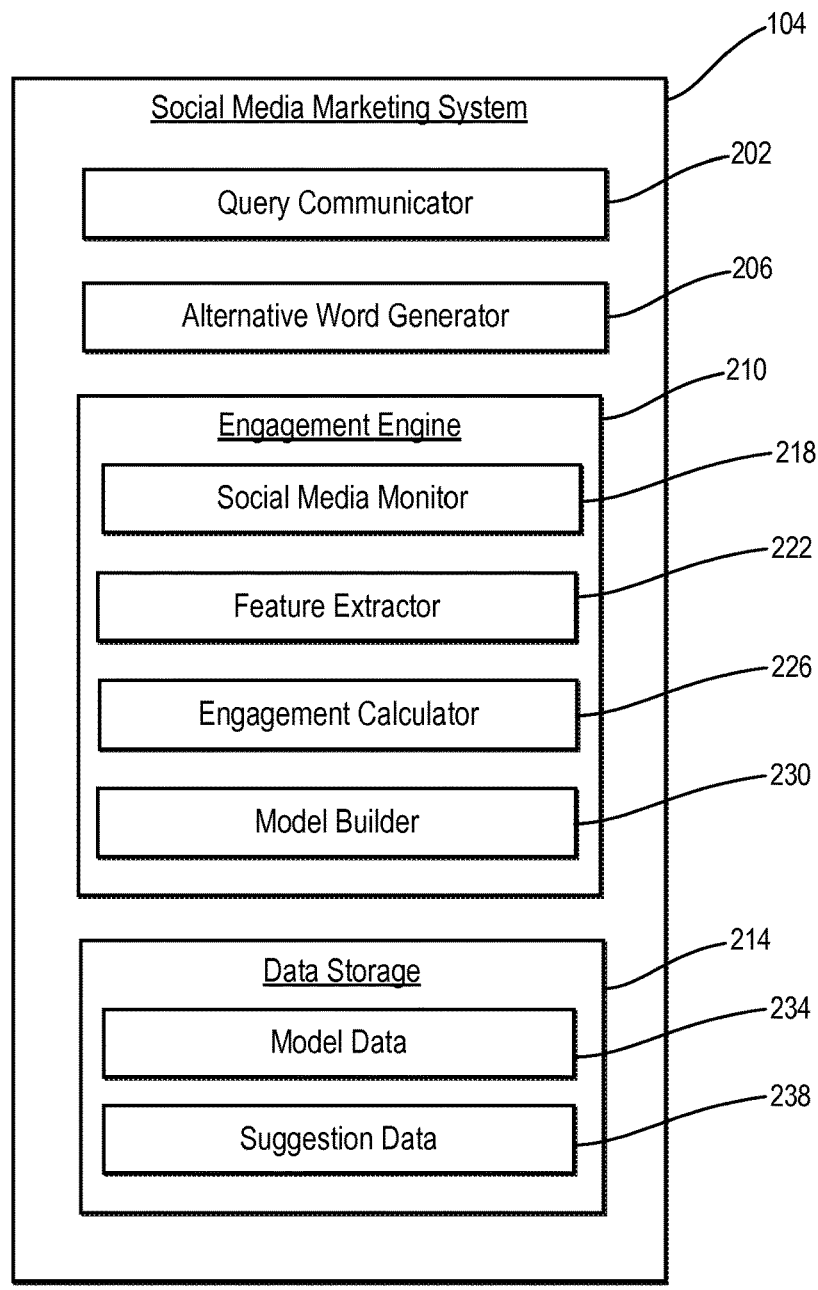
FIG. 2 illustrates a schematic diagram of the social media marketing system of FIG. 1 in accordance with one or more embodiments.

FIG. 2 illustrates a schematic diagram illustrating an example embodiment of the social media marketing system 104. In one or more embodiments, the social media marketing system 104 may include, but is not limited to, a query communicator 202, an alternative word generator 206, an engagement engine 210, and a data storage 214. Although the disclosure herein shows the components 202-214 to be separate in FIG. 2, any of the components 202-214 may be combined into fewer components, such as into a single facility or module, or divided into more components as may serve one or more embodiments. In addition, the components 202-214 may be located on, or implemented by, one or more computing devices, such as those described below in relation to FIG. 7.

The components 202-214 can comprise software, hardware, or both. For example, the components 202-214 can comprise one or more instructions stored on a computer readable storage medium and executable by a processor of one or more computer devices. When executed by the one or more processors, the computer-executable instructions of the social media marketing system 104 can cause a computing device(s) to perform the methods described herein. Alternatively, the components 202-214 can comprise hardware, such as a special-purpose processing device to perform a certain function. Additionally or alternatively, the components 202-214 can comprise a combination of computer-executable instructions and hardware.

In one or more embodiments, the social media marketing system 104 can perform various tasks to allow provide effective aid to social media marketers. For example, the social media marketing system 104 can build and train an engagement model. The social media marketing system 104 can also utilize the engagement model in suggesting alternative words for use in a social media post in order to increase or optimize the predicted engagement level of the social media post. Accordingly, as shown in FIG. 2, some of the components 202-214 may function to build and train the engagement model, and some of the components 202-214 may function to suggest alternative words in order to increase or optimize the engagement level of a drafted social media post. Alternatively or additionally, the social media marketing system 104 may utilize some of the components 202-214 for both tasks described above. The components that the social media marketing system 104 utilizes to build and train an engagement model will be described first. The components that the social media marketing system 104 utilizes to suggest alternative words for use in a drafted social media post will be described second.

As used herein, an "engagement model" refers to a data model that contains data related to the social media marketing system 104. The social media marketing system 104 can train the engagement model over time to accurately represent a community. The engagement model may be a classifier model or a regression model. Furthermore, in one or more embodiments, an engagement model may be a data structure that contains engagement scores for one or more words cross-referenced with one or more features. For example, as will be described in more detail below, in one embodiment the engagement model may be a lookup table organized with rows, wherein each row is associated with a word, and columns, wherein each column is associated with a feature. Thus, in that embodiment, every cell in the lookup table is associated with one word and one feature. In alternative or additional embodiments, the engagement model may be in the form of any data structure suitable for this purpose (i.e., any type of multi-dimensional data structure).

In practice, the social media marketing system 104 may query an engagement model in order to discover an engagement score for a given word, as applied to a certain feature. For example, a user may want to know how a given word typically performs in social media among a certain community when used in a social media post that is submitted to the social media system 108 in the morning. Accordingly, the social media marketing system 104 may query the engagement model for an engagement score stored at a row associated with the given word, and a column associated with a feature representing morning posts.

Additionally, overtime, the social media marketing system 104 may "train" or update the engagement model. For example, over time, various words may cause an increase in social media engagement in a social media community, only to later decrease in use and popularity among the same community. In one or more embodiments, the social media marketing system 104 may train and periodically re-train the engagement model to accurately represent recent engagement score predictions for words used in social media posts by the community. Thus, a user of the social media marketing system 104 can query the trained engagement model for a prediction as to how a certain word will affect the engagement level of a social media post.

In one or more embodiments, the engagement engine 210 of the social media marketing system 104 builds and trains the engagement model. The engagement engine 210 may include a social media monitor 218, a feature extractor 222, an engagement calculator 226, and a model builder 230. Together, the components 218-230 can build an engagement model. Additionally, the components 218-230 can train the engagement model over time. In order to build an engagement model, and as will be described in greater detail below, the engagement engine 210 can receive social media posts from the social media system 108. The engagement engine 210 can extract one or more features from each of the received social media posts. The engagement engine 210 can calculate an engagement level for each of the received social network posts and build the engagement model by associating the received social network post with its one or more extracted features via the calculated engagement level.

As mentioned above, the engagement engine 210 can include the social media monitor 218. The social media monitor 218 may communicate with the social media system 108 (or multiple social networking systems included in the system 100) via the network 116. For example, the social media monitor 218 can receive social media posts from the social media system 108. In one or more embodiments, the social media monitor 218 can receive social media posts of any type from any social networking system that may be part of the system 100. The social media monitor 218 may receive a predetermined number of social media posts within a threshold amount of time to build an engagement model. The social media monitor 218 may later receive a second number of social media posts for training the engagement model.

Additionally, the social media monitor 218 may organize the received social media posts in various ways in order for the engagement engine 210 to build an engagement model that is applicable to a certain community. In one or more embodiments, the social media monitor 218 may organize the received social media posts according to the social networking system from which the social media posts came. For example, the social media system 108 may only allow social media posts within a certain character limit. Alternatively, the social media system 108 may only allow social media posts containing a digital photograph. Thus, the social media monitor 218 may organize social media posts according to the social media post restrictions or requirements of the social media system 108 from which the social media posts came.

Additionally or alternatively, the social media monitor 218 can organize the received social media posts according to the sender of the social media post or a community with which the sender is associated. For example, the sender may be a member of a social media group dedicated to shopping or may have a certain amount of social media activity indicating association with a social media group dedicated to shopping. Accordingly, the social media monitor 218 may organize the social media posts from that sender, along with other social media posts from other members of the shopping social media group, according to the topic of the group (i.e., "shopping"). Thus, in one or more embodiments, the social media monitor 218 can organize received social media posts based on the community that will be associated with the engagement model.

In one or more embodiments, the social media monitor 218 may maintain one or more social network accounts for the social media system 108. For example, in one embodiment, the social media system 108 may require the social media monitor 218 to have at least one account with the social media system 108 before the social media monitor 218 can monitor social media posts from the users 120. Accordingly, the social media monitor 218 can maintain and utilize a social network account for the social media system 108.

In addition to receiving and organizing social media posts, the social media monitor 218 may also receive meta-data associated with social media posts. For example, a social media post may be associated with other information that describes features of the social media post. The features of a social media post may include, but are not limited to, the time and date when the social media post was submitted to the social media system 108, the frequency of certain terms or keywords in the social media post, the length of the social media post, the type of the social media post, profile information related to the sender of the social media post, and any replies, "likes," re-postings, or comments associated with the social media post. Additionally, if the social media post only includes multimedia (e.g., a digital photograph or video), the features of the social media post may further include descriptive metatags related to the multimedia. In one or more embodiments, the social media monitor 218 can receive and organize information related to features of the social media posts for use in building an engagement model.

As mentioned above, and as illustrated in FIG. 2, the engagement engine 210 may also include a feature extractor 222. For example as described above, the social media monitor 218 can receive information related to features of a social media post. In one or more embodiments, the feature extractor 218 can utilize this received data in order to extract one or more features from a social media post. The feature extractor 218 can extract features from social network posts based on a variety of categories. For example, feature categories can include content-based features, post-time based features, post-frequency based features, post-based features, and/or trend-based features. Each type of feature category will now be described in greater detail.

In one or more embodiments, content-based features may be features that focus on the content of a social media post. For example, content-based features may relate to terms used in the social media post and term-frequency. Term frequency may be a number that reflects how important a given word is to a social media post. For instance, in a social media post containing the text, "Come on down for low low low prices!" the feature extractor 218 may determine the social media post has a high term frequency related to the word "low" based on the three repetitions of the word "low," as well as on a perceived importance of the word "low." Additionally, or alternatively, content-based features may include other features related to punctuation within a social media post, the grammar used within a social media post, any foreign language terms within a social media post, etc.

Furthermore, post-time based features may be features related to when the social media post was drafted and/or submitted to the social media system 108. For example, the feature extractor 218 may identify the time at which the social media post was submitted to the social media system 108 as a post-time based feature. Similarly, the feature extractor 218 may identify the date on which the social media post was submitted to the social media system 108 as a post-time based feature. Additionally, the feature extractor 218 may identify the day of the week on which the social media post was submitted to the social media system 108 as a post-time based feature. Furthermore, the feature extractor 218 may identify the general time of day (i.e., morning, afternoon, evening) when the social media post was submitted to the social media system 108 as a post-time based feature.

Additionally, in one or more embodiments, post-frequency based features may be features that focus on how frequently posts are drafted and/or submitted to the social media system 108. For example, the feature extractor 218 may identify the time since a previous social media post containing a given word was submitted to the social media system 108. Similarly, the feature extractor 218 may identify how many social media posts containing a given word have been submitted to the social media system 108 within a given time frame (in the last twenty four hours, in the last week, etc.). This type of information may originate at the social media system 108, which in-turn may transmit the data along with the associated social media post.

Furthermore, in one or more embodiments, post-based features may be features that focus on data describing the social media post. For example, the feature extractor 218 may identify the length of the social media post as a feature. Similarly, the feature extractor 218 may identify the type of the social media post (e.g., depending on the type of the social media system 108) as a feature. Additionally, the feature extractor 218 may identify the geographic area from which the social media post was sent (e.g., based on a geographic area associated with an IP address from which the social media post originated), or demographic information associated with the sender of the social media post (e.g., sex, age, income-level, etc.) based on a social media system profile associated with the sender.

Also, in one or more embodiments, trend-based features may be features that focus on how a social media post trends over time within the social media system 108. For example, the feature extractor 218 may identify "likes," positive and negative replies, and re-posts of a social media post in order to determine a popularity level or positivity level of a social media post. Similarly, the feature extractor 218 may identify an amount of original matter contained in a social media post compared to other social media posts.

Once the feature extractor 218 has extracted one or more features from a social media post received by the social media monitor 218, the feature extractor 222 can collate the extracted features into the framework of an engagement model. As described above, an engagement model may represent the engagement levels that exist within a certain community. For example, an engagement model may represent engagement levels that have been determined for a social network community. Accordingly, that engagement model can include a framework of features that have been extracted from social media posts received by the engagement engine 210 from members of a community.

Next, as mentioned above, the engagement engine 210 can also include an engagement calculator 226. In one or more embodiments, the engagement calculator 226 can determine an engagement level for a social media post received by the social media monitor 218 that was submitted to the social media system 108 (i.e., a historical social media post). In particular, the engagement calculator 226 can determine an engagement level for a received social media post that has already been submitted by one of the users 120a-120d by utilizing data associated with the social media post. For example, in one or more embodiments, data associated with the social media post can include various engagement indicators such as, but not limited to, "likes" of the social media post, shares including the social media post, re-postings of the social media post, and comments made in response to the social media post. As mentioned above, an "engagement level" of a social media post refers to an amount of interaction the social media system 108 detects between social media users and the social media post. For example, if a social media post has a high engagement level, the social media post may have had multiple "likes," replies, re-posts, etc. Conversely, a social media post with a low engagement level may have replies that contain negative language. It follows that a social media post with a neutral engagement level may have no replies, no "likes," and no re-posts (i.e., indicating that the social media post was either not read, or failed to engage readers in any significant way).

As mentioned above, as and shown in FIG. 2, the engagement engine 210 can also include a model builder 230. The model builder 230 can build and train an engagement model utilizing the received social media posts, the extracted features, and the calculated engagement levels. In order to build an engagement model, the model builder 230 can begin by parsing each social media post received from the social media system 108. In one or more embodiments, the model builder 230 can parse a social media post by analyzing the social media post into its various parts and identifying the syntactic role of each part. For example, the model builder 230 can parse a social media post, utilizing natural language processing, by dividing the text of the social media post into one or more nouns, verbs, adjectives, adverbs, etc. Additionally the model builder 230 may identify keywords within each parsed social media post.

In one or more embodiments, the model builder 230 may identify keywords within a social media post by determining the main topics of the social media post. As used herein, a "keyword" is a word or metatag used in a social media post that likely causes a community to engage with the social media post. For instance, in a social media post containing the text, "Come on down for low low low prices!" the model builder may identify all the various words in the social media post and determine one or more keywords in the social media post. In an embodiment, the model builder 230 can identify keywords including "low" (e.g., word repetition may indicate importance), and "prices" (e.g., the topic of the sentence). Additionally, the model builder 230 may disregard the words that are not likely keywords (i.e., prepositions such as "on" and "for").

Once the model builder 230 has parsed the social media post and identified one or more keywords from the social media post, the model builder 230 can build an engagement model based on the social media post. In an embodiment, and as described above, the engagement model may be a lookup table or two-dimensional array, wherein the model builder 230 can dedicate each row to a keyword identified from the social media post, and each column to a feature extracted from the social media post. In one or more embodiments, the model builder 230 may store the calculated engagement level for the social media post at the intersection of a keyword and a feature. Additionally, the model builder 230 may repeat that process for each keyword and feature associated with the social media post. Thus, from one social media post, the model builder 230 may build an engagement model including one or more rows dedicated to keywords of the social media post, one or more columns dedicated to the features extracted from the social media post, and the engagement level of the social media post at the intersection of each row and column.

The model builder 230 may repeat the engagement model building process for every other received social media post related to the engagement model. For example, as described above, the social media monitor 218 can receive and organize social media posts according to a given community of social media users. Thus, the model builder 230 can build an engagement model representing the engagement levels of a community of social media users by cycling through the social media posts associated with that community. Accordingly, in one or more embodiments, the model builder 230 may utilize multiple social media posts to build an engagement model including multiple rows and columns wherein each social media post may or may not include every keyword and/or feature listed in the engagement model.

In one embodiment, over the course of building an engagement model, the model builder 230 may analyze a social media post to discover a keyword and feature intersection that already exists within the engagement model. For example, in the example described above (i.e., "Come on down for low low low prices!" with an extracted "short post" feature), the model builder 230 may have stored an engagement level at the intersection for the row dedicated to the keyword "prices", and the column dedicated to the feature "short post." Accordingly, in one or more embodiments, if the model builder 230 next analyzes a post containing the text, "We have the best prices in town," the model builder 230 can average the engagement level of the post, "We have the best prices in town," with the engagement score already stored at the intersection of the row for "prices" and the column for the feature "short post," creating an engagement score for that combination of keyword and feature. Thus, as the model builder analyzes a large number of social media posts associated with a given community, the values stored in the engagement model become more reflective of the engagement habits of the community.

The model builder 230 may periodically engage in re-training an engagement model once the engagement model has been built. For example, the model builder 230 may build an engagement model from an initial group of social media posts from a certain social media community. In one embodiment, the model builder 230 may later "re-train" the engagement model once additional social media posts have been received from the same community. Re-training the engagement model refers to the same process of analyzing and averaging engagement levels described above. In this way, the model builder 230 may continually update the engagement model to accurately represent the engagement habits of the community. Alternatively or additionally, the model builder 230 may re-train an engagement model based on passage of time (i.e., may re-train the engagement model once a day), or based on how frequency the engagement model is accessed (i.e., frequently accessed engagement models are re-trained more often than less frequently accessed engagement models).

As described above, once the engagement engine 210 has built and trained an engagement model, the social media marketing system 104 can utilize the engagement model to suggest alternative words for use in a drafted social media post in order to optimize or increase the engagement level of the social media post. In one or more embodiments, this process may begin when the social media marketing system 104 receives a drafted social media post and a query word. As mentioned above, and as shown in FIG. 2, the social media marketing system 104 can include a query communicator 202. The query communicator 202 can receive a copy of a social media post from a client device 112*d* that has been drafted, but not submitted to the social media system 108. For example, in one or more embodiments, a drafted social media post may include text, photographs, and other multimedia. The query communicator 202 may optionally only receive a copy of a textual portion of a drafted social media post, or alternatively, the query communicator 202 may receive everything included in the drafted social media post.

Additionally, the query communicator 202 can receive, from a client device 112*d*, an indication of a query word from the drafted social media post draft. As used herein, a "query word" may be any word included in a drafted social media message for which a marketer desires alternative word suggestions or which the social media marketing system 104 determines can benefit from an alternative word. Thus, the marketer 120*d* can select the query word from the drafted social media message in order to indicate to the social media marketing system 104 that the marketer 120*d* wishes to have an alternative word suggested for substitution with the query word.

Next, as mentioned above, the query communicator 202 can also provide one or more alternative word suggestions to at least one of the client device 112*d* in response receiving the query word. For example, in one or more embodiments, the query communicator 202 can report the indicated query word to an alternative word generator 206 (as shown in FIG. 2). The alternative word generator 206 can identify and format one or more alternative word suggestions.

In one or more embodiments, the alternative word generator 206 may begin the process of identifying one or more alternative word suggestions by first identifying a context of the query word. For example, the query word may be a member of any part of speech (i.e., the query word may be a noun, a verb, an adjective, and adverb, etc.). In many cases, one word can be a different part of speech, depending on the context of the word in a sentence. For instance, the word "run" can be a noun (e.g., "Let's go for a run!"), or a verb (e.g., "I run fast."). Accordingly, the alternative word generator 206 may identify what part of speech the query word belongs based on the context of the query word within the draft of the social media post. In one or more embodiments, the alternative word generator 206 may utilize word-sense disambiguation ("WSD") and natural language processing ("NLP") in order to identify the context of the query word within the draft of the social media post.

Next, the alternative word generator 206 may continue the process of identifying one or more alternative word suggestions by identifying one or more words that are similar to the query word, based on the context of the query word. For example, if the query word is a noun (e.g., "run"), the alternative word generator 206 may identify synonyms for the query word that are nouns (e.g., "race," "rush," "dash"). Alternatively, if the query word is a verb (e.g., "run"), the alternative word generator 206 may identify synonyms for the query word that are verbs (e.g., "administrate," "conduct," "direct"). In additional examples, the alternative word generator 206 may identify synonyms for the query word based on any part of speech. In one or more embodiments, the alternative word generator 206 may identifying all synonyms for a query word, or alternatively, may only identify a predetermined number of synonyms for the query word.

Following this, the alternative word generator 206 may then convert the identified synonyms into the same format as the query word. For example, if the query word is a verb, it is possible for a verb to be conjugated into a variety of tenses. For instance, the verb "run" can be conjugated into a gerund (i.e., "running"), or into an infinitive ("to run"). Alternatively, the verb "run" may be conjugated into indicative tense (i.e., indicative-present "I run," indicative-perfect "I have run," indicative-past "I ran," indicative-pluperfect "I had run," indicative-future "I will run," indicative-future-perfect "I will have run"), subjunctive tense (i.e., subjunctive-present "I run," subjunctive-present "I have run," subjunctive-imperfect "I ran," subjunctive-pluperfect "I had run"), conditional tense (i.e., conditional-present "I would run," conditional-perfect "I would have run"), or imperative tense (i.e., "you run"). The verb "run" may alternatively be conjugated into progressive forms, such as progressive-indicative tense (i.e., progressive-indicative-present "I am running," progressive-indicative-perfect "I have been running," progressive-indicative-past "I was running," progressive-indicative-pluperfect "I had been running," progressive-indicative-future "I will be running," progressive-indicative-future-perfect "I will have been running"), or progressive-conditional text (i.e., progressive-conditional-present "I would be running," progressive-conditional-perfect "I would have been running"). As such, the alternative word generator 206 can determine the correct conjugation of the query word and convert any of the one or more identified synonyms of the query word into the same tense or form.

In one or more embodiments, the social media marketing system 104 may provide the one or more identified and converted synonyms of the query word to the client device 112 without any further processing. Alternatively, in one embodiment, the social media marketing system 104 may utilize a trained engagement model in order to provide alternative word suggestions that will likely optimize or increase the engagement level of the drafted social media post. For example, as described above, the engagement engine 210 may build and train an engagement model for a given community that represents engagement scores for various keywords and extracted features. Thus, in an embodiment and in addition to the functions described above, the engagement engine 210 may further process the one or more identified and converted synonyms of the query word through the trained engagement model in order to determine which synonyms will likely optimize or increase the engagement level of the drafted social media post.

In order to determine whether an alternative word suggestion (i.e., an identified and converted synonym) will likely increase or optimize the engagement level of the drafted social media post, the social media marketing system 104 can first determine the engagement level of the drafted social media post, so as to establish a baseline. For example, as mentioned above, the engagement engine 210 can include the engagement calculator 226. In one embodiment, and in addition to determining an engagement level for a social media post that was submitted to the social media system 108 (i.e., a historic social media post) as described above, the engagement calculator 226 can also determine a predicted engagement level for the drafted social media post that has not yet been submitted to the social media system 108.

In order to determine the baseline engagement level of the drafted social media post, the engagement engine 210 can direct the feature extractor 222 to extract one or more features from the drafted social media post. As described above, the feature extractor 218 can extract features from social network posts based on a variety of categories (i.e., content-based features, post-time based features, post-frequency based features, post-based features, and/or trend-based features). However, when extracting features from drafted social network posts that have not yet been submitted to the social media system 108, the feature extractor 218 may only be able to extract features related to the content of the drafted social network post (i.e., the text of the drafted social network post) and the features related to certain meta-data of the drafted social network post (i.e., the length of the post, the type of post, a social media system profile, etc.).

Once one or more features of the drafted social media post have been extracted, the engagement calculator 226 may then parse the drafted social media post for one or more keywords, and described above. Finally, the engagement calculator 226 can query a trained engagement model for a set of engagement scores stored at the intersection of each parsed keyword and each extracted feature. As described above, each of the engagement scores in the engagement model are representative of a level of engagement a certain community has had with a certain keyword with regard to a given feature. Next, in order to determine an engagement score for each keyword in a drafted social media post, the engagement calculator 226 may average together the queried engagement scores for each keyword and all the features for which the keyword has an intersection. The engagement calculator 226 may aggregate together the determined engagement scores for each keyword parsed from the drafted social media post into an engagement level for the drafted social media post.

Accordingly, once the engagement engine 210 has calculated the baseline engagement level for the drafted social media post, the engagement engine 210 may calculate predicted engagement scores for each of the one or more alternative words identified by the alternative word generator 206, as described above. In one or more embodiments, the engagement engine 210 can calculate a predicted engagement score for an alternative word by again utilizing the trained engagement model and the one or more features extracted from the drafted social media post. For example, in order to calculate a predicted engagement score for an alternative word, the engagement engine 210 may first determine whether the alternative word exists in the trained engagement model. As described above, the trained engagement model may be lookup table wherein each row is associated with a keyword identified from one or more historical social media posts.

If the alternative word exists in the trained engagement model as a keyword, the engagement engine 210 may then query the trained engagement model for a set of engagement scores stored at the intersections of the row associated with the alternative word and each column associated with the one or more features extracted from the drafted social media post. Finally, the engagement engine 210 can average the set of engagement scores together into an engagement score for the alternative word. The engagement engine 210 may then proceed to repeat that process for the remaining alternative words identified by the alternative word generator 206.

Once engagement scores have been calculated for the one or more alternative words, the query communicator 202 can provide the alternative words and their engagement scores to the marketer 120d via the corresponding client device 112d. For example, the query communicator 202 may provide the alternative words in a selectable list along with an indication as to whether the engagement score of a given alternative word is higher or lower than the engagement level of the drafted social media post. Thus, one of the marketer 120d may easily see whether or not a given alternative word is likely to increase the engagement level of the drafted social media post. Additionally or alternatively, the query communicator 202 may only provide the alternative words that have engagement scores that are higher than the predicted engagement level of the drafted social media post. This process will be described in greater detail below with regard to FIGS. 4A and 4B.

In alternative embodiments, rather than determining alternative words for query words selected by the marketer, the social media marketing system 104 can analyze each word in the social media post provided by the marketer for alternative words. If a word in the social media posts has an alternative word(s) with a higher engagement score, the social media marketing system 104 can provide the alternative word to the marketer. Thus, the social media marketing system 104 can analyze and provide alternative words for query words selected by a marketer or analyze an entire social media post for alternative words that will increase the effectiveness of the social media post.

Additionally, as mentioned above, and as illustrated in FIG. 2, the social media marketing system 104 can include a data storage 214 including model data 234 and recommendation data 238. In one or more embodiments, model data 234 may include one or more engagement models that have been built and trained by the engagement engine 210. Furthermore, the suggestion data 238 can include data related to alternative word suggestions made by the social media marketing system 104 to the marketer 120d via the client device 112d.

Figure 3A:
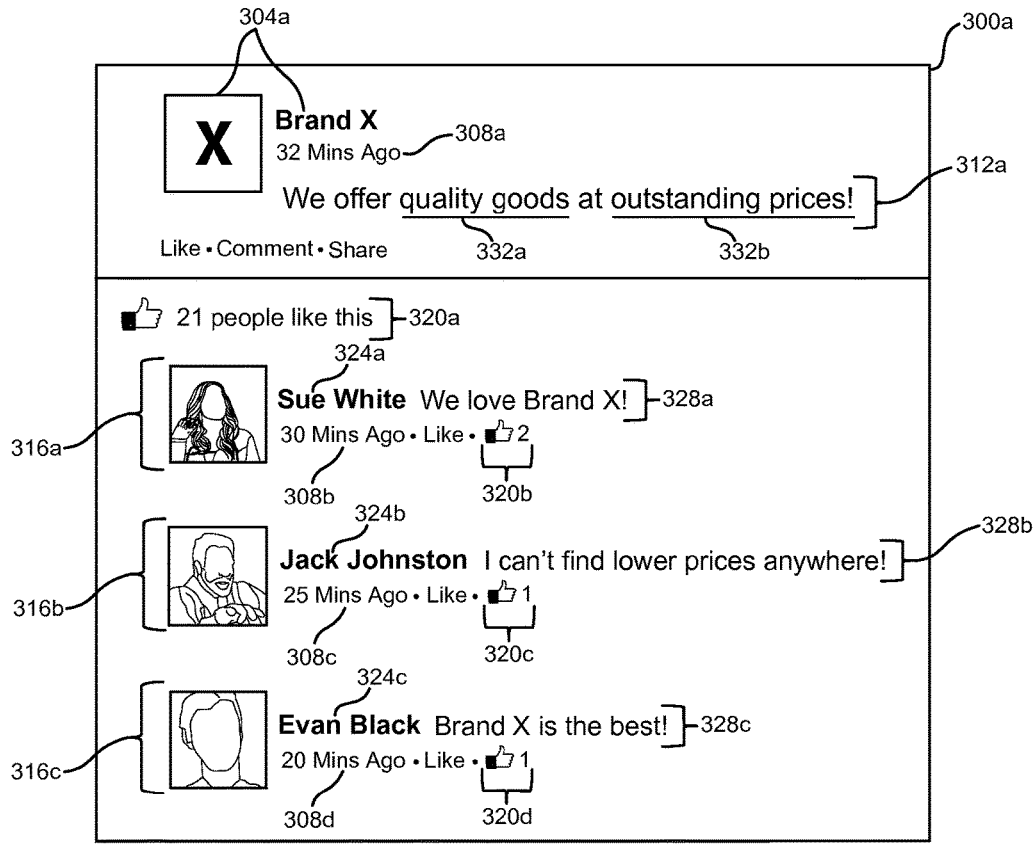
FIGS. 3A-3C illustrate social media posts containing social media post data in accordance with one or more embodiments.

As discussed above, the engagement engine 210 can build and train an engagement model based on historical social media posts submitted by the users 120a, 120b, 120c, and 120d to the social media system 108. This process will now be described in connection with FIGS. 3A-3C. As illustrated in FIG. 3A, the social media marketing system 104 can receive/extract, via the social media monitor 218, social media post data contained within a social media interface 300a. In one or more embodiments, the social media interface 300a can include various identifiers, indicators, posts, and replies.

For example, as shown in FIG. 3A, the social media interface 300a can include a user identifier 304a, a social media post 312a, one or more social media replies 316a-316c, and one or more reply messages 328a-328c. In one or more embodiments, the user identifier 304a can include a user image, a screen name or media handle, and/or other identifying information. In some embodiments, the user associated with the user identifier 304a can configure the user identifier 304a via a user profile associated with the social media system 108.

The social media post 312a can include a message (i.e., "We offer quality goods at outstanding prices!") submitted by a user associated with the user identifier 304a to the social media system 108. In one or more embodiments, the user associated with the user identifier 304a may submit the social media post 312a to the social media system 108 via a client device. As described above, once the user associated with the user identifier 304a submits the social media post 312a to the social media system 108, the social media system 108 can provide the social media post 312a to any users associated with the user via the social media system 108 or alternatively all users. Accordingly, in at least one embodiment, the social media marketing system 104 is also associated with the user in order to be provided with the social media post 312a by the social media system 108.

As mentioned above, users to whom the social media system 108 provides the social media post 312a may engage with the social media post 312a in various ways. For example, a user may "like" the social media post 312a, re-share the social media post 312a, reply to the social media post 312a, and/or comment on the social media post 312a. Accordingly, the social media interface 300a may include various engagement indicators that reflect the types of engagement received in connection with the social media post 312a. As shown in FIG. 3A, the social media interface 300a can include one or more social media replies 316a-316c, each including a reply message 328a-328c.

Also as shown in FIG. 3A, each social media reply 316a-316c can include a responder identifier 324a, 324b, or 324c, and a reply message 328a, 328b, or 328c. In one or more embodiments, as with the user identifier 304a above, the responder identifiers 324a-324c can include a user image, a screen name or media handle, and/or other identifying information. Along similar lines, like the social media post 312a above, each reply message 328a-328c can include a message submitted by the users associated with the responder identifiers 324a-324c to the social media system 108 in response to the social media post 312a.

Another type of engagement is a "like." As used herein, a "like" is merely an indication that a user has expressed agreement or solidarity with the social media post 312a. In one embodiment, any user associated with the user who submitted the social media post 312a might like the social media post 312a by simply clicking an interface element on one of the client devices, according to the functionality of the social media system 108. For example, as shown in FIG. 3A, a like indicator 320a can indicate likes users have expressed for the social media post 312a. Similarly, like indicators 320b-320d can indicate likes that have been expressed for the reply messages 328a-328c, respectively.

Additionally, the social media post 312a and each of the reply messages 328a-328c are associated with a submission time indicator 308a, 308b, 308c, or 308d. In one or more embodiments, the submission time indicators 308a-308d indicate when a user submitted the social media post 312a, or any of the reply messages 328a, 328b, or 328c to the social media system 108. For example, as shown in FIG. 3A, the submission time indicator 308a may indicate the user submitted the social media post 312a to the social media system 108 "32 Mins Ago." In additional or alternative embodiments, the submission time indicators 308a, 308b, 308c, and 308d can comprise other formats. For example, the submission time indicators 308a, 308b, 308c, and 308d can comprise a format indicating what day the social media post 312a was submitted to the social media system 108 (e.g., "today," "yesterday," etc.).

As mentioned above, the social media marketing system 104 can utilize data represented in the social media interface 300 to build an engagement model. For example, as described above, the social media marketing system 104 can build engagement models according to either the type of the social media post 312a or a community associated with the social media post 312a, or both. In one or more embodiments, the social media system 108 may dictate the type of the social media post 312a. For instance, if the social media system 108 is of a type that only allows for social media posts within a certain character limit (e.g., TWITTER), the social media marketing system 104 may build an engagement model with all social media posts of that type.

Additionally or alternatively, if the sender of the social media post 312a is a member of a given community, the social media marketing system 104 may utilize the information within the social media interface 300 to build and/or train an engagement model associated with the community in which the sender is a member. In one or more embodiments, the social media marketing system 104 can identify the community in which a user is a member by searching a social media profile associated with the user (i.e., "Brand X" may have a social media profile that identifies it as a retail company), and/or analyzing social media activities engaged in by the user for common themes and practices. For example, as shown in FIG. 3A, the user associated with the user identifier 304a may regularly engage with social media posts focused on shopping. As such, the social media marketing system 104 can determine that the user is a member of a community of social media users dedicated to shopping.

Once the social media marketing system 104 has determined an appropriate engagement model to build using the information contained in the social media interface 300a, the engagement engine 210 may begin building the engagement model. For example, with regard to the information contained within the social media interface 300a in FIG. 3A, the feature extractor 222 may extract the following features: use of an exclamation point (i.e., a content-based feature related to punctuation); the post-time and post-date (i.e., as indicated by the submission time indicator 308a); the length of time since "Brand X" last submitted a social media post (i.e., as indicated by the social media system 108); the number of times "Brand X" has submitted a social media post in the last twenty four hours (i.e., as indicated by the social media system 108); a short post length (i.e., a post-based feature related to post length); the type of the post (i.e., as dictated by the social media system 108); the age of the post; the sex of the poster; and a medium engagement level (i.e., as indicated by the three reply messages 328a, 328b, 328c, and the twenty one likes indicated by the like indicator 320a). Accordingly, the engagement engine 210 may utilize these ten extracted features in building an engagement model directed to a community of social media users who are interested in shopping.

Once the feature extractor 222 has extracted one or more features from a social media post, the engagement calculator 226 can determine an engagement level for the social media post 312a. For example, as described above, the social media marketing system 104 can receive not only the social media post 312a but other meta-data associated with the social media post 312a, as represented by the other elements included in the social media interface 300a. Specifically, the social media marketing system 104 can receive one or more engagement indicators associated with the social media post 312a (i.e., the social media replies 316a-316c, and the like indicators 320a-320d). In one embodiment, the engagement calculator 226 can determine an engagement level for the social media post 312a by analyzing these engagement indicators.

The engagement calculator 226 may analyze engagement indicators in a variety of ways. For example, in one or more embodiments, the engagement calculator 226 may determine the engagement level for the social media post 312a to be fairly high in response to three reply messages 328a-328c associated with the social media post 312a. Additionally, the engagement calculator 226 may determine the engagement level for the social media post 312a to be fairly high in response to the twenty one likes indicated by the like indicator 320a.

In one embodiment, the engagement calculator 226 may also analyze one or more sentiments expressed in each reply message 328a-328c. For example, as shown in FIG. 3A, each reply message 328a-328c expresses a strongly positive sentiment (e.g., as indicated by words like "love" and "best", and the use of exclamation points) toward the social media post 312a. Thus, the engagement calculator 226 may determine that the reply messages 328a-328c indicate a stronger engagement level for the social media post 312a than if the reply messages 328a-328c were only weakly positive or neutral in their sentiment toward the social media post 312a. Accordingly, likes indicated toward positively inclined reply messages (i.e., as indicated by the like indicators 320b-320d) may cause the engagement calculator 226 to further bolster the determined engagement level for the social media post 312a. In other words, multiple engagement indicators that are positively inclined toward a social media post may indicate to the engagement calculator 226 that the community of social media users has a high engagement level with the social media post.

In one or more embodiments, a user can submit a reply message that expresses a negative in response to the social media post 312a. In that case, the engagement calculator 226 may lower the determined engagement level for the social media post proportionately with the strength of the negative sentiment expressed in the reply message (i.e., the determined engagement level for a social media post should reflect the amount of positive engagement the social media post has within a given community of social media users). For example, the engagement calculator 226 may determine a reply message such as, "I've found better prices at other stores besides Brand X," to be weakly negative toward the social media post 312a. Furthermore, the engagement calculator 226 may determine a reply message like, "I hate Brand X!" to be strongly negative toward the social media post 312a. Accordingly, the engagement calculator 226 may decrease the determined engagement level a small amount in light of a weakly negative reply message, and may decrease the determined engagement level a large amount in light of a strongly negative reply message. Additionally, any likes associated with a negatively inclined reply message may further decrease a determined engagement level for a social media post.

Once the engagement engine 210 has extracted features from the social media post 312a and has determined an engagement level for the social media post 312a, the model builder 230 can parse the social media post 312a into one or more keywords. As discussed above, the model builder 230 can utilize natural language processing to identify one or more keywords within a social media post. For example, as shown in FIG. 3A, the model builder 230 may parse the social media post 312a in order to identify a keyword 332a (i.e., "quality goods"), and another keyword 332b (i.e., "outstanding prices"). Accordingly, a keyword may be a single word, or may be a combination of words, such as a phrase.

The model builder 230 may also identify further keywords based on alternative forms of the keywords parsed from the social media post 312a. For example, as described above, the model builder 230 can parse keywords 332a and 332b from the social media post 312a, where both of the keywords 332a, 332b are a two-word phrase. Accordingly, the model builder 230 may identify additional keywords based on the parsed keywords 332a, 332b. In one embodiment, the additional keywords are single words taken from the keywords 332a, 332b (i.e., "quality," "goods," "outstanding," "prices").

The model builder 230 may continue by building a model based on the information identified and extracted from the social media post 312a and the other information represented in the social media interface 300a. For example, as discussed above, the model builder 230 may build an engagement model in the format of a lookup table. In one or more embodiments the model builder 230 may construct the engagement model by dedicating a column in the lookup table to each of the ten features extracted from the information related to the social media post 312a (i.e., use of an exclamation point, the post-time, the post-date, the length of time since "Brand X" last submitted a social media post, the number of times "Brand X" has submitted a social media post in the last twenty four hours; a short post length, the type of the post, the age with which "Brand X" identifies, the sex with which "Brand X" identifies, and a medium engagement level).

The model builder 230 can add a row to the lookup table dedicated to each keyword 332a, 332b parsed by the model builder 230 (i.e., "quality goods" and "outstanding prices"), as well as the additional keywords identified by the model builder 230 (i.e., "quality," "goods," "outstanding," "prices"). Thus, the model builder 230 now has a lookup table with a row for each keyword related to the social media post 312a and a column for each feature related to the social media post 312a. As mentioned above, in alternative embodiments, the model builder 230 may build the engagement model in a different format or structure, but regardless of the format, the model builder 230 can utilize the same keywords and features in building the engagement model.

In one or more embodiments, the model builder 230 can add the engagement level for the social media post 312a calculated by the engagement calculator 226 to every intersection of each keyword and each feature. For example, as described above, the model builder 230 may format the engagement model as a lookup table with a row for each keyword and a column for each feature. Accordingly, the model builder 230 may store the engagement level for the social media post 312a at a cell where each row intersects with each column.

In some embodiments, the model builder 230 may alter the engagement level before storing an engagement level at various intersections. For example, if a social media post has a high engagement level and includes a certain keyword multiple times, the model builder 230 may store the engagement level plus one at every intersection in the engagement model including the row dedicated to that certain keyword. Similarly, in another example, if a social media post with a certain keyword is associated with a negatively inclined reply message including the same certain keyword, the model builder 230 may store the engagement level minus one at every intersection in the engagement model including the row dedicated to that certain keyword. Thus, the engagement model represents how a community of media users has engaged with the social media post 312a.

Figure 3B:
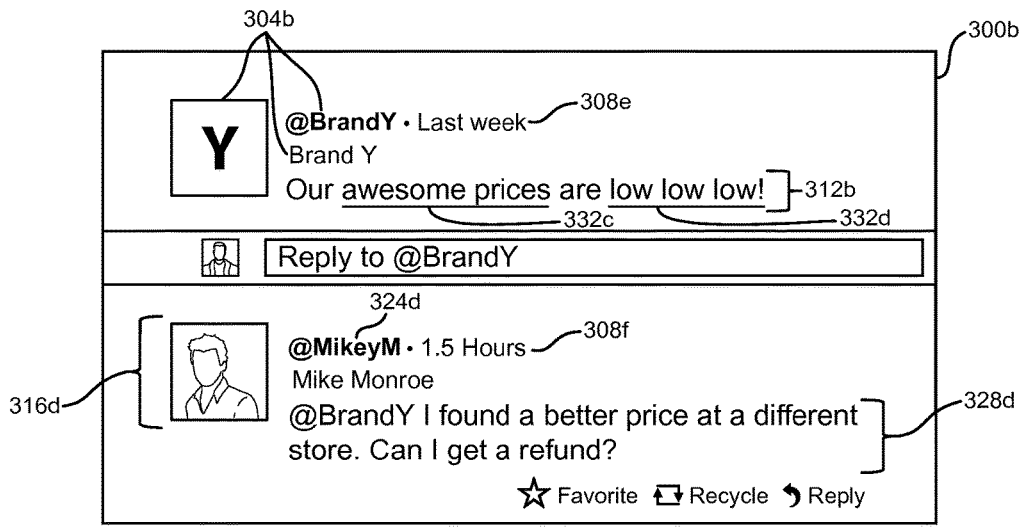

The engagement model becomes a more robust and accurate representation of how a community of social media users engages with various social media posts after the engagement engine 210 has trained the engagement model. The process for training the engagement model will now be described with reference to FIGS. 3B and 3C. As described above, the social media monitor 218 can monitor various types of social media posts. For example, as shown in FIG. 3B, the social media interface 300b illustrates a type of social media post that is limited to a certain number of characters. In one or more embodiments, the social media interface 300b can include a user identifier 304b, a responder identifier 324d, and submission time indicators 308e, 308f, similar to the same elements describe with reference to FIG. 3A. Additionally, the social media interface 300b can also include a social media post 312b (i.e., "Our awesome prices are low low low!"), and a reply message 328d (i.e., "I found a better price at a different store. Can I get a refund?").

In one or more embodiments, the engagement engine 210 may utilize the information included in the social media interface 300b to train the engagement model described with reference to FIG. 3A. For example, the engagement engine 210 can begin by extracting one or more features from the information associated with the social media post 312b (e.g., use of a repeated word, use of an exclamation point, post time, post date, the length of time since "Brand Y" last submitted a social media post, the number of submissions made by "Brand Y" in the last twenty four hours, a short post length, the type of post, and a low engagement level). In one or more embodiments, the engagement engine 210 may extract one or more features that are not already represented in the engagement model. In that case, the model builder 230 can add one or more new columns to the engagement model for each of the one or more additional features.

Next, the engagement engine 210 may determine an engagement level associated with the social media post 312b. Through the same process described above with reference to FIG. 3A, the engagement engine 210 may determine the social media post 312b has a low engagement level. For example, the engagement engine 210 may identify that the social media post 312b is associated with only one reply message 328d. Additionally, the engagement engine 210 may determine that the sentiment of the reply message 328d is negative (i.e., due to topics of the reply message 328d including "different store" and "refund").

Following the extraction of one or more features from the information associated with the social media post 312b and the calculation of the engagement level for the social media post 312b, the engagement engine 210 can parse one or more keywords from the social media post 312b. For example, the engagement engine 210 can parse the keyword 332c (i.e., "awesome prices"), and keyword 332d (i.e., "low low low") from the social media post 312b. Additionally, the engagement engine 210 can identify other keywords based on the parsed keywords (i.e., "awesome," "prices," "low," "low low").

The engagement engine 210 can train the engagement model based on the features, keywords, and engagement level associated with the social media post 312b. For example, the model builder 230 can train the engagement model based on four different scenarios. In the first scenario, both a keyword and a feature associated with the social media post 312b are not represented in the engagement model (i.e., "awesome" was not part of the social media post 312a, and the use of a repeated word feature was not extracted from the information associated with the social media post 312a). In that case, the model builder can add a row for the keyword and a column for the feature, and can store the engagement level associated with the social media post 312b at the intersection of each new keyword row and new feature column.

In the second scenario, a keyword identified in the social media post 312b already exists in the engagement model, but a feature extracted from the information associated with the social media post 312b does not (i.e., "prices" was a part of the social media post 312a, but the use of a repeated word feature was not extracted from the information associated with the social media post 312a). In that case, the model builder 230 can add a new column dedicated to the new feature. Furthermore, the model builder 230 can store the engagement level calculated for the social media post 312b at the intersection of the existing keyword row and the new feature column.

In the third scenario, a keyword identified in the social media post 312b does not already exist in the engagement model, but a feature extracted from the information associated with the social media post 312b does exist in the engagement model (i.e., "low" was not part of the social media post 312a, but the short post feature was extracted from the information associated with the social media post 312a). In that case, the model builder 230 can add a new row dedicated to the new keyword. Furthermore, the model builder 230 can store the engagement level calculated for the social media post 312b at the intersection of the new keyword row and the existing feature column.

In the fourth scenario, a keyword identified in the social media post 312b exists in the engagement model, and a feature extracted from the information associated with the social media post 312b also exists in the engagement model (i.e., "prices" is also part of the social media post 312a, and the short post feature was also extracted from the information associated with the social media post 312a). In this case, the model builder 230 can average the existing engagement score stored at the intersection of the existing keyword row and the existing feature column with the engagement level calculated for the social media post 312b. Thus, the new engagement score stored at the intersection of the existing keyword row and the existing feature column reflects an average engagement score for the relevant community for the existing keyword as applied to the existing feature.

Figure 3C:
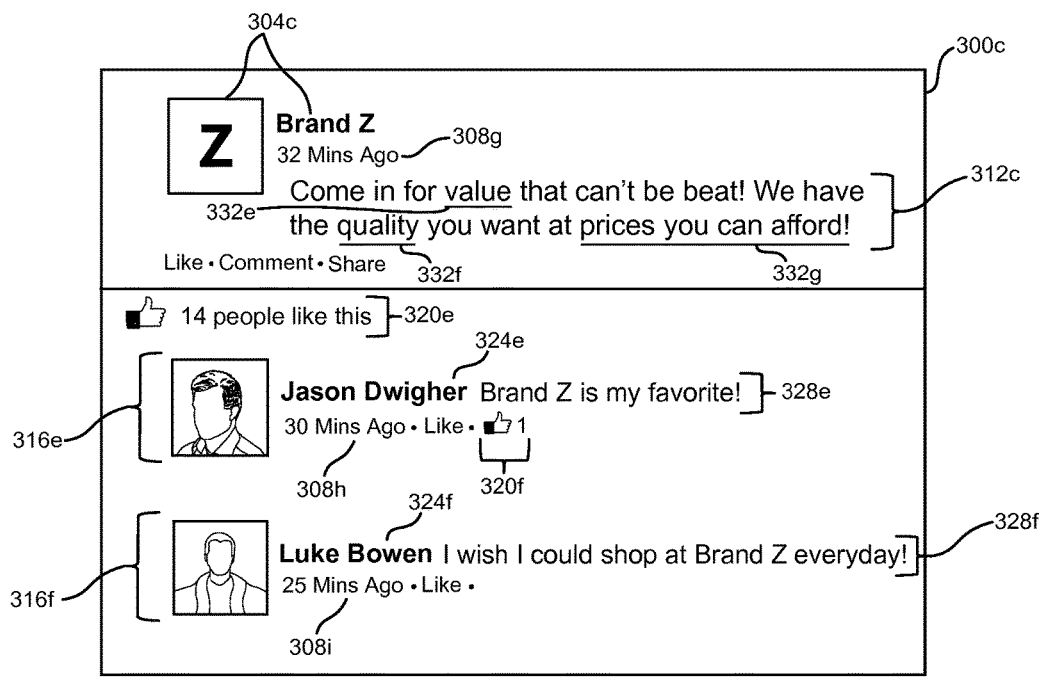

In one or more embodiments, the engagement engine 210 can continue to train the engagement model by performing the same process as described above in connection with further social media posts. For example, the engagement engine 210 can continue to train the engagement model after receiving the information laid out in the social media interface 300c, as illustrated in FIG. 3C. As with the social media interface 300a, the social media interface 300c can include a user identifier 304c, submission time indicators 308g, 308h, 308i, a social media post 312c, social media replies 316e and 316f, like indicators 320e and 320f, responder identifiers 324e and 324f, and reply messages 328e and 328f.

As with the social media posts 312a and 312b, the engagement engine 210 can extract one or more features from the information associated with the social media post 312c. Similarly, the engagement engine 210 can calculate an engagement level for the social media post 312c. Additionally, the engagement engine 210 can parse the social media post 312c into a keyword 332e (i.e., "value"), a keyword 332f (i.e., "quality"), and a keyword 332g (i.e., "prices you can afford"). As described above and using the one or more extracted features, the calculated engagement level, and the one or more keywords, the engagement engine 210 can further train the engagement model for the community of social media users interested in shopping to more accurately reflect how the community engages with social media posts based on keywords and post features.

As mentioned above, the social media marketing system 104 can build and train an engagement model and utilize the engagement model in suggesting alternative words. Once an engagement model is complete using the techniques discussed above with reference to FIGS. 3A-3C. The social media marketing system 104 can utilize the engagement model to suggest alternative words for use in a drafted social media post, as described with reference to FIGS. 4A and 4B.

Figure 4A:
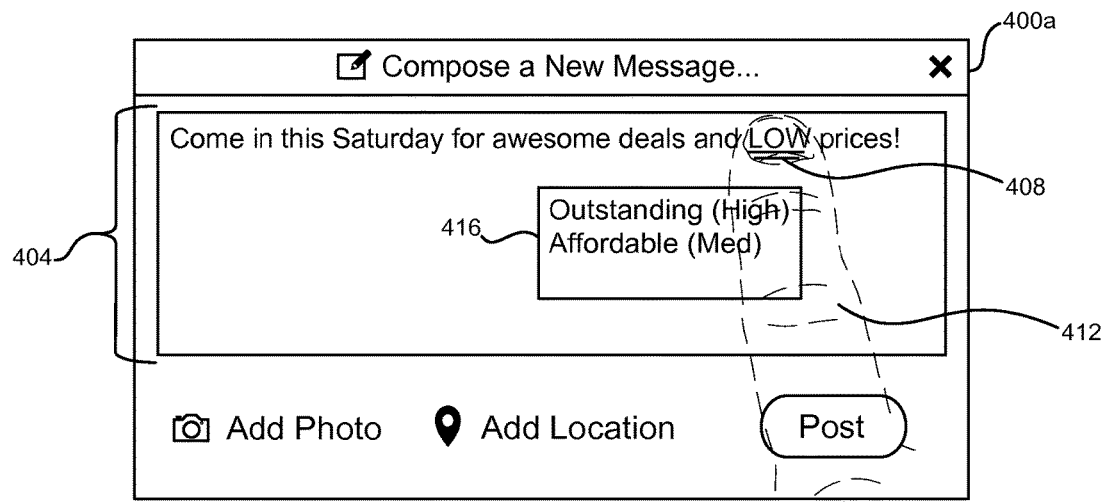
FIGS. 4A-4B illustrate graphical user interfaces for providing one or more alternative word suggestions in accordance with one or more embodiments.

The social media marketing system 104 can suggest alternative words in a variety of ways. In one embodiment, a user may provide a draft of a social media post and a query word to the social media marketing system 104 for alternative word suggestions. For example, as shown in FIG. 4A, the social media marketing system 104 can provide an alternative word suggestion interface 400a including a social media post input box 404 in addition to other interface controls. The social media marketing system 104 can provide the alternative word suggestion interface 400a to a user via a client device 112d. In one or more embodiments, the social media post input box 404 is a standard text input box where a user can type a draft of a social media post (i.e., "Come in this Saturday for awesome deals and low prices!").

In one embodiment, the user may provide the draft of the social media post and the query word to the query communicator 202 by selecting a word in the draft of the social media post within the social media post input box 404. For example, as shown in FIG. 4A, the selection of a query word 408 (i.e., "LOW") by the user's finger 412 can cause the alternative word suggestion interface 400a to provide the draft of the social media post and the query word 408 to the query communicator 202. In one or more embodiments, upon selection of the query word 408, the alternative word suggestion interface 400a can alter the presentation of the query word 408 such that it stands out (e.g., change the word to all capital letters and add a double-underline).

Based on the social media marketing system 104 receiving the draft of the social media post and the indication of the query word 408, the alternative word generator 206 can first identify the context of the query word. In one or more embodiments, as discussed above, the alternative word generator 206 can begin by determining a part of speech associated with the query word 408. For example, the alternative word generator 206 can determine the query word 408 "low" is an adjective describing the word "prices." Thus, based on the word the query word 408 is describing, the alternative word generator 206 can determine that "low" is not referring to any other meanings (i.e., close to the ground or short).

The alternative word generator 206 can identify one or more words that are similar to the query word 408, based on the context of the query word 408. In one or more embodiments, the alternative word generator 206 can identify one or more words that are similar to the query word 408 "low" that can include adjectives such as, "cheap," "inexpensive," "reduced," "outstanding," "reasonable," and "affordable." The alternative word generator 206 may identify these words based on the fact that they are synonyms of the query word 408. Additionally or alternatively, the alternative word generator 206 may identify these words based on the fact that they are common adjectives used in connection with the "prices." The alternative word generator 206 can utilize a standard thesaurus in identifying the one or more alternative words, or may utilize other databases, web searches, or other resources to identify the one or more alternative words.

The alternative word generator 206 can convert the one or more identified alternative words into the same format as the query word 408. For example, as described above, the query word 408 "low" is an adjective in the draft of the social media post. As such, the alternative word generator 206 can ensure that any potential alternative word suggestions are adjectives as well. When the query word 408 is a verb, however, the alternative word generator 206 would be able to identify the correct tense of the query word 408 and convert the one or more alternative words into the same verb tense.

As part of providing the user with the one or more alternative words likely to increase or optimize the engagement level of the draft of the social media post, the social media marketing system 104 can utilize the trained engagement model to determine a predicted engagement score for each of the one or more identified alternative words. In one or more embodiments, the process for determining a predicted engagement score for an alternative word suggestion begins with the feature extractor 222 extracting one or more features from the drafted social media post typed into the social media post input box. Unlike the features extracted from historical social media posts that have already been submitted to the social media system 108, features extracted from a drafted social media post may not include features related to the various types of engagement (i.e., comments, re-posts, likes, etc.) as the drafted social media post has not yet been submitted to the social media system 108. Accordingly, the feature extractor 222 may extract features based on the drafted social media post that include features related to the terms used in the post, the time and date on which the post was drafted, the time since the user last drafted a social media post, the length of the post, the type of the post, etc.

Furthermore, the engagement calculator 226 can determine a predicted engagement level for the draft of the social media post. In one or more embodiments, the engagement calculator 226 can determine a predicted engagement level for the draft of the social media post by parsing the draft of the social media post into one or more words, identifying a predicted engagement score for each of the one or more words parsed from the draft of the social media post, and averaging all the identifying engagement scores into a predicted engagement level for the draft of the social media post. In one embodiment, the predicted engagement level for the draft of the social media post establishes a baseline in determine whether a suggested alternative word will further increase or optimize the engagement level of the draft of the social media post.

For example, as part of identifying a predicted engagement score for a word parsed from the draft of the social media post, the engagement calculator 226 can determine whether the word parsed from the draft of the social media post exists as a keyword within the engagement model. If the parsed word does exist as a keyword in the engagement model, the engagement calculator 226 can query the engagement model for the engagement scores stored at intersections of the row dedicated to the parsed word and the columns dedicated to the one or more extracted features. In one or more embodiments, the engagement calculator 226 can average the queried engagement scores into a predicted engagement score for the parsed word. Then, as mentioned above, the engagement calculator 226 can repeat this process for words parsed from the draft of the social media post. The engagement calculator 226 can aggregate the predicted engagement scores for the parsed words into a predicted engagement level for the draft of the social media post.

The engagement calculator 226 can also determine a predicted engagement score for each of the one or more alternative words identified by the alternative word generator 206. In one or more embodiments, the engagement calculator 226 determines a predicted engagement score for an alternative word by first determining whether the alternative word exists as a keyword in the engagement model. If the alternative word exists as a keyword in the engagement model, the engagement calculator 226 can query the engagement model for the engagement scores stored at every intersection of the row dedicated to the alternative word and each of the columns dedicated to the one or more extracted features from the draft of the social media post. In one or more embodiments, the engagement calculator 226 can average the queried engagement scores into a predicted engagement score for the alternative word. In one embodiment, the engagement calculator 226 may repeat this process to determine a predicted engagement score for each of the identified alternative words.

In response to the engagement calculator 226 determining predicted engagement scores for each of the one or more alternative words identified by the alternative word generator 206, the query communicator 202 can provide the one or more alternative words to the user via a client device 112d. For example, as shown in FIG. 4A, the query communicator 202 may provide the one or more alternative words as a pop-up alternative word selection control 416 or other interface element. In one or more embodiments, the pop-up alternative word selection control 416 includes a list of selectable elements wherein each selectable element is associated with one of the one or more alternative words. In one embodiment, a selection of an alternative word in the alternative word selection control 416 causes a substitution of the query word 408 with the selected alternative word.

In one embodiment, the query communicator 202 may provide all of the one or more alternative words identified by the alternative word generator 206 within the alternative word selection control 416. Alternatively, the query communicator 202 may only provide the alternative words that exist in the engagement model within the alternative word selection control 416. Additionally or alternatively, the query communicator 202 may provide an indication of the predicted engagement score of each of the alternative words listed in the alternative word selection control 416.

As shown in FIG. 4A, the query communicator 202 may also provide an indicator as to what effect the listed alternative word will likely have on an engagement level of the drafted social media post. For example, if the predicted engagement score for an alternative word is much higher than the predicted engagement level for the drafted social media post, the query communicator 202 may add an indicator "(High)" next to the alternative word in order to indicate to the user that the word "Outstanding" will likely increase the engagement level of the drafted social media post by a significant amount. Similarly, the query communicator 202 may add an indicator "(Med)" next to an alternative word that will likely increase the engagement level of the drafted social media post by only a moderate amount (i.e., as with the alternative word "Affordable").

Additionally, in one or more embodiments, the query communicator 202 may rank the one or more alternative words provided to the client device 112d. For example, as shown in FIG. 4A, the query communicator 202 can rank the one or more alternative words listed in the alternative word selection control 416 according to each word's predicted engagement score. In one or more embodiments, the query communicator 202 can rank the one or more alternative words from highest predicted engagement score to lowest.

As mentioned above, the social media marketing system 104 can suggest alternative words in a variety of ways. In addition to the method described above with reference to FIG. 4A, the social media marketing system 104 may also suggest alternative words as a user is typing a draft of a social media post into the social media post input box 404. For example, using the same processes described above, the social media marketing system 104 can determine a predicted engagement score for each new word typed into the social media post input box 404, and provide one or more alternative word suggestions before the user is finished composing the draft of the social media post.

Figure 4B:
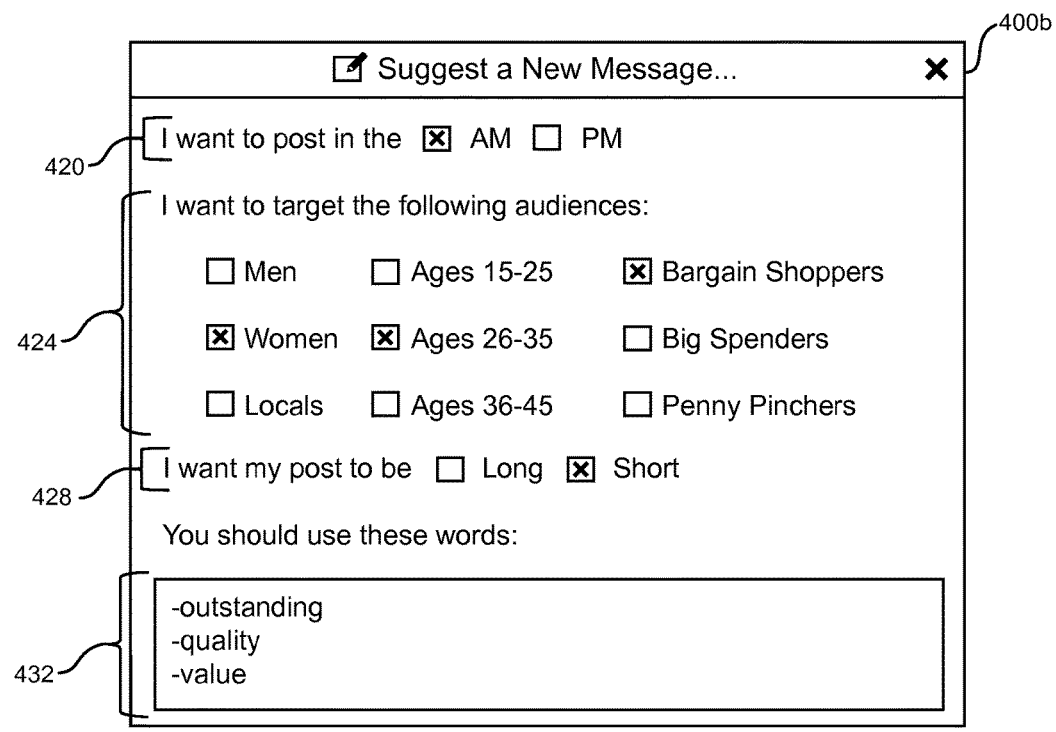

Additionally or alternatively, the user may specify features of a future social media post, and have the social media marketing system 104 suggest words for inclusion in the social media post that will likely increase or optimize the post for engagement within a given community of social media users. For example, as shown in FIG. 4B, the social media marketing system 104 can provide the alternative word suggestion interface 400b to a user via the client device 112d. In one or more embodiments, the alternative word suggestion interface 400b can include various controls that enable the user to specify various features of the future social media post. For example, the alternative word suggestion interface 400b can include a post time selection control 420, a target audience selection control 424, and a post length selection control 428.

In one embodiment, the social media marketing system 104 can provide the controls 420, 424, and 428 as part of the alternative word suggestion interface 400b based on the social media post features that exist in an engagement model associated with a social media community of which the user is a member. For example, if the social media marketing system 104 determines the user is a member of a social media community dedicated to shopping (i.e., by analysis of the user's social media activities or profile), the social media marketing system 104 can identify one or more features that exist in the engagement model dedicated to that community. As described above with reference to FIGS. 3A-3C, the features that may exist in that engagement model the post time, the post date, the age and sex of the poster, geographic features, income features, length of the post, etc. Accordingly, the social media marketing system 104 can provide the controls 420, 424, and 428 based on these features.

The social media marketing system 104 can provide one or more alternative word suggestions for inclusion in a future social media post based on the user's selections within the controls 420, 424, and 428. For example, as shown in FIG. 4B, the user may utilize the controls 420, 424, and 428 to indicate the future post will be submitted to the social media system 108 in the morning, that the post will target women between the ages of 26-35 who are bargain shoppers, and that the post will be short in length. Based on these indications, the engagement engine 210 can query the engagement model for high or the highest engagement scores stored in each column associated with the following features: morning post time; women; ages 26-35; medium income level; and short post length. Once the engagement engine 210 identifies the highest or a high engagement score in one of those columns, the engagement engine 210 can identify the keyword associated with the row that intersects with the column at the high or highest engagement score. The engagement engine 210 can repeat that process for each of the columns associated with the indicated features.

In one or more embodiments, the social media marketing system 104 will suggest the one or more identified keywords for use in the future social media post. For example, as shown in FIG. 4B, the alternative word suggestion interface 400b can also include an alternative word list control 432. In one embodiment, the social media marketing system 104 can provide the one or more identified keywords within the alternative word list control 432. For instance, as illustrated in FIG. 4B, based on the control selection made by the user via the controls 420, 424, and 428, the social media marketing system 104 can utilize the engagement model described above to suggest "outstanding," "quality," and "value" to the user for inclusion in a future social media post. In one or more embodiments, the social media marketing system 104 may rank the word suggestions listed in the alternative word list control 432 based on each word's predicted engagement score, and/or may provide the predicted engagement score next to the word.

Figure 5:
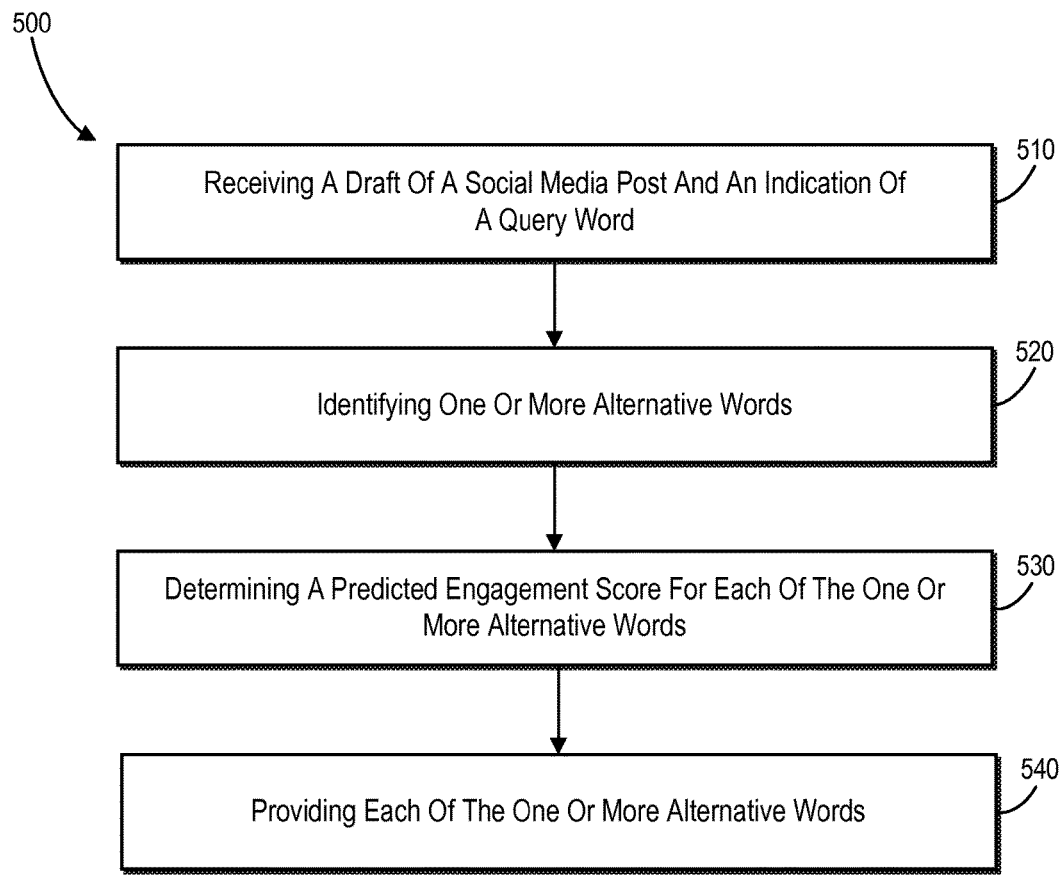
FIG. 5 illustrates a flowchart of a series of acts in a method of suggesting one or more alternative words for a social media post in accordance with one or more embodiments.
Figure 6:
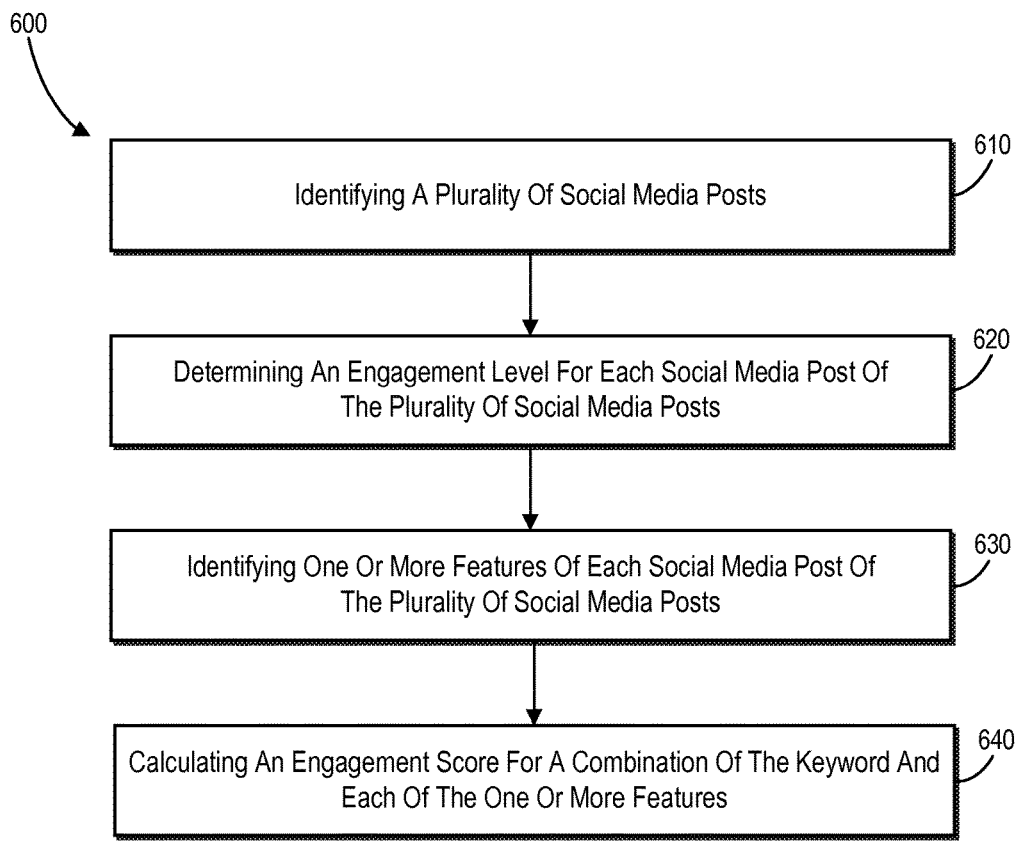
FIG. 6 illustrates a flowchart of a series of acts in another method of suggesting one or more alternative words for a social media post in accordance with one or more embodiments.

FIGS. 1-4B, the corresponding text, and the examples, provide a number of different systems and devices for increasing or optimizing the engagement level of a social media post for a given community of social media users. In addition to the foregoing, one or more embodiments can also be described in terms of flowcharts comprising acts and steps in a method for accomplishing a particular result. For example, FIGS. 5 and 6 illustrate flowcharts of exemplary methods in accordance with one or more embodiments. The methods described in relation to FIGS. 5 and 6 may be performed with less or more steps/acts or the steps/acts may be performed in differing orders. Additionally, the steps/acts described herein may be repeated or performed in parallel with one another or in parallel with different instances of the same or similar steps/acts.

FIG. 5 illustrates a flowchart of one example method 500 of suggesting an alternative word for use in a social media post. The method 500 includes an act 510 of receiving a draft of a social media post and an indication of a query word. In particular, the act 510 can involve receiving, from a client device 112d, a draft of a social media post and an indication of a query word in the social media post to analyze for alternative suggestions for the query word. Act 510 can involve receiving a draft of a social media post and one or more query words selected by a marketer. Alternatively, act 510 can involve receiving a draft of a social media post and identifying a query word from the text of the social media post. Identifying a query word from the social media post can involve identifying one or more keywords in the social media post that have a potential of effecting an engagement level of the social media post.

The method 500 can further include an act 520 of identifying one or more alternative words 520. In particular, the act 520 can involve identifying one or more alternative words that have a similar meaning as the query word. For example, act 520 can involve querying a thesaurus for synonyms of the query word. In one or more embodiments, act 520 includes identifying a context of the query word and converting the synonyms of the query word into the same context as the query word.

The method 500 can also include an act 530 of determining a predicted engagement score for each of the one or more alternative words. In particular, the act 530 can involve determining, based on one or more features associated with the social media post, a predicted engagement score for each of the one or more alternative words. For example, in one embodiment, act 530 involves identifying one or more engagement scores associated with each of the one or more alternative words and each of the one or more features. Additionally, act 530 can involve averaging the identified one or more engagement scores associated with each alternative word into a predicted engagement score for the alternative word. Furthermore, in one or more embodiments, the act 530 of determining a predicted engagement score for each of the one or more alternative words can be performed automatically and without human intervention.

Furthermore, the method 500 can include an act 540 of providing each of the one or more alternative words. In particular, the act 540 can involve providing, to the client device 112*d*, each of the one or more alternative words. In one or more embodiments, act 540 comprises providing each of the one or more alternative words in a selectable list 416. Optionally, act 540 further includes ranking the selectable list based on the predicted engagement score for each of the one or more alternative words.

Additionally, the method 500 can further include an act of determining a predicted engagement level for the draft of the social media post. In one or more embodiments, determining a predicted engagement level for the draft of the social media post can include parsing the draft of the social media post into one or more words, identifying predicted engagement scores for each of the one or more words based on each of the one or more features associated with the social media post, and averaging the identified predicted engagement scores for each of the one or more words into a predicted engagement level for the draft of the social media post. Furthermore, in one or more embodiments, providing, to the client device each of the one or more alternative words further comprises providing an indication of whether the predicted engagement score for each of the one or more alternative words is higher than the predicted engagement level for the draft of the social media post.

FIG. 6 illustrates a flowchart of an example method 600 of method of determining engagement scores for alternative words for social media postings. The method 600 includes an act 610 of identifying a plurality of social media posts. In particular, the act 610 can involve identifying a plurality of social media posts including a keyword. In one or more embodiments, the method 600 can further include identifying one or more engagement indicators associated with each of the plurality of social media posts including the keyword. For example, identifying one or more engagement indicators associated with each of the plurality of social media posts including the keyword can include identifying one or more of a social media reply, a social media share, a social media "like," or a social media comment for each of the plurality of social media posts including the keyword.

The method 600 can also include an act 620 of determining an engagement level for each social media post of the plurality of social media posts. In particular, the act 620 can involve determining an engagement level for each social media post of the plurality of social media posts including the keyword. In one or more embodiments, determining the engagement level for each social media post of the plurality of social media posts including the keyword is based on the identified one or more engagement indicators associated with each social media post.

The method 600 can further include an act 630 of identifying one or more features of each social media post of the plurality of social media posts. In particular, the act 630 can involve identifying one or more features of each social media post of the plurality of social media posts including the keyword. For example, one or more features associated with the social media post can be one or more of a term frequency for a given term in the social media post, a time at which the social media post was submitted, a date the social media post was submitted, a time since another social media post was submitted containing the keyword, a number of posts containing the keyword submitted within a threshold time frame, a length of the social media post, a type of the social media post, an indicator of how original the social media post is, or an indicator of the popularity of a social media post.

Additionally, the method 600 can include an act 640 of calculating an engagement score for a combination of the keyword an each of the one or more features. In particular, the act 640 can involve calculating an engagement score for a combination of the keyword and each of the one or more features based on the determined engagement levels of the social media posts including the keyword and the one or more features. For example, act 640 can involve calculating an average of the determined engagement levels for one or more identified social media posts of the plurality of social media posts. Additionally, the method 600 can further include an act of generating an engagement model based on the calculated average. In one or more embodiments, the act of calculating an engagement score for a combination of the keyword and each of the one or more features can be performed automatically, and without human intervention.

Furthermore, the method 600 can include an act including receiving a social media post. In one or more embodiments, the method 600 can further include parsing the received social media post into one or more words, and identifying the keyword from among the one or more words. Thus, in one embodiment, identifying the plurality of social media posts including the keyword is based on the identified keyword parsed from the received social media post.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
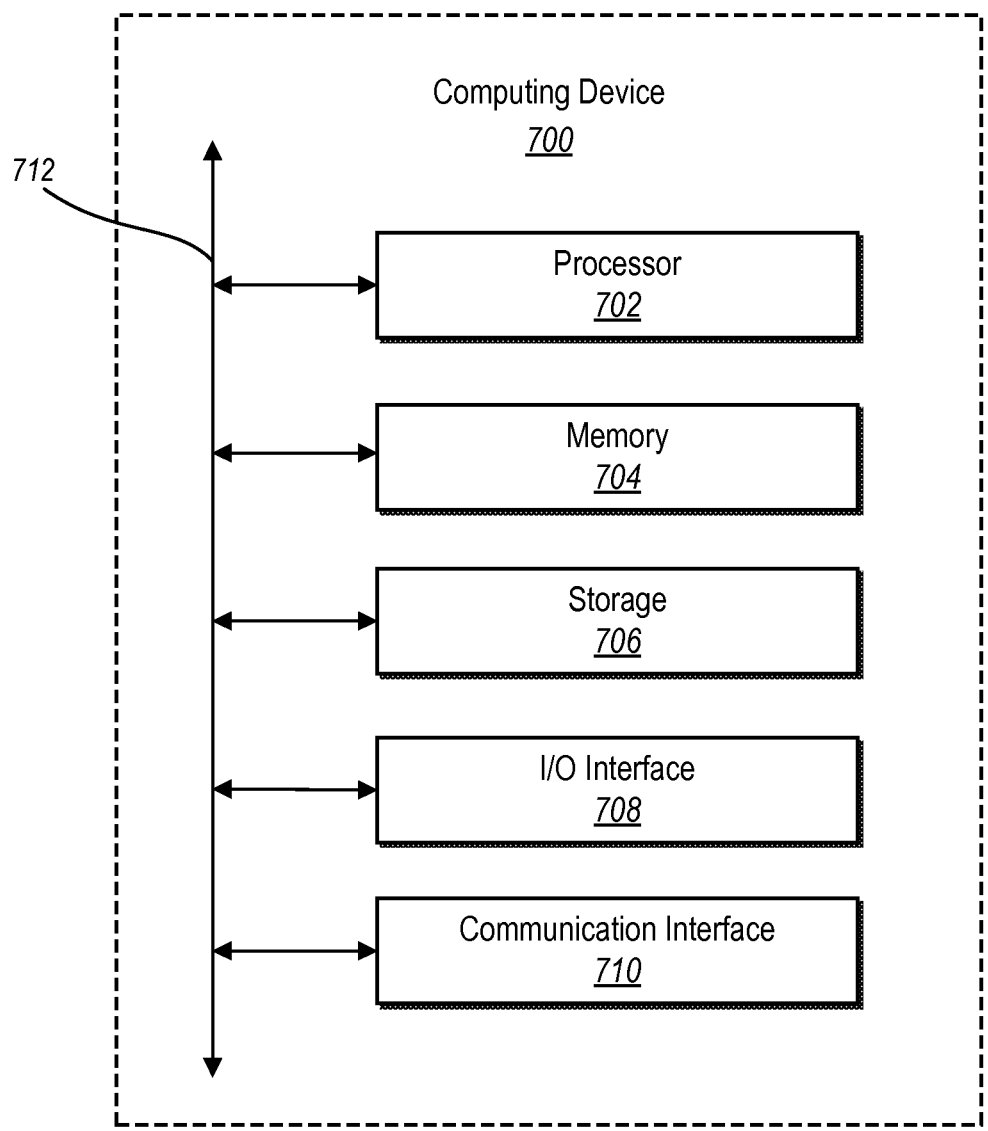
FIG. 7 illustrates a block diagram of an exemplary computing device in accordance with one or more embodiments.

FIG. 7 illustrates a block diagram of an exemplary computing device 700 that may be configured to perform one or more of the processes described above. One will appreciate that the social media marketing system 104 may be implemented by one or more computing devices such as the computing device 700. As shown by FIG. 7, the computing device 700 can comprise a processor 702, memory 704, a storage device 706, an I/O interface 708, and a communication interface 710, which may be communicatively coupled by way of a communication infrastructure 712. While an exemplary computing device 700 is shown in FIG. 7, the components illustrated in FIG. 7 are not intended to be limiting. Additional or alternative components may be used in other embodiments. Furthermore, in certain embodiments, the computing device 700 can include fewer components than those shown in FIG. 7. Components of the computing device 700 shown in FIG. 7 will now be described in additional detail.

In particular embodiments, the processor 702 includes hardware for executing instructions, such as those making up a computer program. As an example and not by way of limitation, to execute instructions, the processor 702 may retrieve (or fetch) the instructions from an internal register, an internal cache, the memory 704, or the storage device 706 and decode and execute them. In particular embodiments, the processor 702 may include one or more internal caches for data, instructions, or addresses. As an example and not by way of limitation, the processor 702 may include one or more instruction caches, one or more data caches, and one or more translation lookaside buffers (TLBs). Instructions in the instruction caches may be copies of instructions in the memory 704 or the storage 706.

The memory 704 may be used for storing data, metadata, and programs for execution by the processor(s). The memory 704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 704 may be internal or distributed memory.

The storage device 706 includes storage for storing data or instructions. As an example and not by way of limitation, the storage device 706 can comprise a non-transitory storage medium described above. The storage device 706 may include a hard disk drive (HDD), a floppy disk drive, flash memory, an optical disc, a magneto-optical disc, magnetic tape, or a Universal Serial Bus (USB) drive or a combination of two or more of these. The storage device 706 may include removable or non-removable (or fixed) media, where appropriate. The storage device 706 may be internal or external to the computing device 700. In particular embodiments, the storage device 706 is non-volatile, solid-state memory. In other embodiments, the storage device 706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 708 allows a user to provide input to, receive output from, and otherwise transfer data to and receive data from the computing device 700. The I/O interface 708 may include a mouse, a keypad or a keyboard, a touch screen, a camera, an optical scanner, network interface, modem, other known I/O devices or a combination of such I/O interfaces. The I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication) between the computing device 700 and one or more other computing devices or networks. As an example and not by way of limitation, the communication interface 710 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 710 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 710 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 710 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 712 may include hardware, software, or both that couples components of the computing device 700 to each other. As an example and not by way of limitation, the communication infrastructure 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method for suggesting alternative words for use in social media postings, the method comprising:
receiving, by a computing device comprising at least one processor, a draft of a social media post and an indication of a query word in the social media post to analyze for alternative suggestions for the query word;
receiving a plurality of characteristics of a target audience for the social media post;
identifying, by the at least one processor, a context of the query word using disambiguation;
identifying, by the at least one processor, one or more alternative words that have a similar meaning as the query word given the identified context of the query word;
determining, by the at least one processor, a predicted engagement score relative to users of a social media system having the plurality of characteristics for each of the one or more alternative words based on past performances of prior social media posts including the one or more alternative words and one or more features in common with the social media post by:
   for each alternative word in the one or more alternative words: identifying, within an engagement model associated with the users of the social media system having the plurality of characteristics of the target audience, one or more engagement scores associated with the alternative word and each of the one or more features, and
   averaging the identified one or more engagement scores associated with the alternative word into a predicted engagement score relative to the users for the alternative word; and
providing at least one alternative word based on the predicted engagement scores in response to the draft of the social media post.

2. The method as recited in claim 1, further comprising determining a predicted engagement level relative to the target audience for the draft of the social media post, wherein determining a predicted engagement level for the draft of the social media post comprises:
   parsing the draft of the social media post into one or more words;
   identifying predicted engagement scores for each of the one or more words based on one or more features associated with the social media post; and
   aggregating the identified predicted engagement scores for the one or more words into a predicted engagement level for the draft of the social media post.

3. The method as recited in claim 2, further comprising providing an indication of whether the predicted engagement score for each of the one or more alternative words is higher than the predicted engagement level for the draft of the social media post.

4. The method as recited in claim 3, wherein the one or more features in common with the social media post comprise one or more of a term frequency for a given term in the social media post, a time at which the social media post was submitted, a date the social media post was submitted, a time since another social media post was submitted containing the query word, a number of posts containing the query word submitted within a threshold time frame, a length of the social media post, a type of the social media post, an indicator of how original the social media post is, or an indicator of a popularity of a social media post.

5. The method as recited in claim 1, wherein identifying one or more alternative words that have a similar meaning as the query word given the identified context of the query word comprises identifying synonyms of the query word.

6. The method as recited in claim 5, further comprising converting each of the synonyms of the query word into the same context as the query word.

7. The method as recited in claim 1, wherein providing the at least one alternative word based on the predicted engagement scores in response to the draft of the social media post comprises providing each of the one or more alternative words in a selectable list.

8. The method as recited in claim 7, further comprising ranking the selectable list based on the predicted engagement score for each of the one or more alternative words.

9. A non-transitory computer readable storage medium comprising instructions that, when executed by at least one processor, cause a computer system to:
   receive a plurality of characteristics of a target audience for a social media post;
   identify a plurality of social media posts associated with a social media group of users having the plurality of characteristics within a social media system and including a keyword;
   determine an engagement level for each social media post of the plurality of social media posts associated with the social media group of users having the plurality of characteristics and including the keyword;
   identify one or more features of each social media post of the plurality of social media posts associated with the social media group of users having the plurality of characteristics and including the keyword; and
   determine an engagement score for a combination of the keyword and each of the one or more features based on the determined engagement levels of the social media posts including the keyword and the one or more features by:
      for each feature: identifying, within an engagement model associated with the users of the social media system having the plurality of characteristics of the target audience, one or more engagement scores associated with the keyword and the feature, and
      averaging the identified one or more engagement scores associated with the keyword and the feature into an engagement score for the combination of the keyword and the feature.

10. The non-transitory computer readable storage medium as recited in claim 9, further comprising instructions that, when executed by the at least one processor, cause the computer system to:
   prior to identifying the plurality of social media posts associated with the social media group of users having the plurality of characteristics and including the keyword, receive the social media post;
   parse the received social media post into one or more words;
   identify the keyword from among the one or more words; and
   wherein identifying the plurality of social media posts associated with the social media group of users having the plurality of characteristics and including the keyword is based on the identified keyword parsed from the received social media post.

11. The non-transitory computer readable storage medium as recited in claim 10, further comprising instructions that, when executed by the at least one processor, cause the computer system to identify one or more engagement indicators associated with each of the plurality of social media posts associated with the social media group of users having the plurality of characteristics and including the keyword.

12. The non-transitory computer readable storage medium as recited in claim 11, wherein the instructions, when executed by the at least one processor, cause the computer system to identify one or more engagement indicators associated with each of the plurality of social media posts associated with the social media group of users having the plurality of characteristics and including the keyword by identifying one or more of a social media reply, a social media share, a social media "like," or a social media comment for each of the plurality of social media posts associated with the social media group of users having the plurality of characteristics and including the keyword.

13. The non-transitory computer readable storage medium as recited in claim 12, wherein the instructions, when executed by the at least one processor, cause the computer system to determine the engagement level for each social media post of the plurality of social media posts associated with the social media group of users having the plurality of characteristics and including the keyword by generating a score based on the identified one or more engagement indicators associated with each social media post.

14. The non-transitory computer readable storage medium as recited in claim 13, wherein the one or more features of each social media post comprise one or more of a term frequency for a given term in the social media post, a time at which the social media post was submitted, a date the social media post was submitted, a time since another social media post was submitted containing the keyword, a number of posts containing the keyword submitted within a threshold time frame, a length of the social media post, a type of the social media post, an indicator of how original the social media post is, or an indicator of a popularity of a social media post.

15. The non-transitory computer readable storage medium as recited in claim 14, wherein the instructions, when executed by the at least one processor, cause the computer system to calculate an average of the determined engagement levels for one or more identified social media posts of the plurality of social media posts associated with the social media group of users having the plurality of characteristics and including the keyword.

16. The non-transitory computer readable storage medium as recited in claim 15, further comprising instructions that, when executed by the at least one processor, cause the computer system to include the calculated average in the engagement model associated with the users of the social media system having the plurality of characteristics of the target audience.

17. The non-transitory computer readable storage medium as recited in claim 16, further comprising instructions that, when executed by the at least one processor, cause the computer system to store, in the engagement model associated with the user of the social media system having the plurality of characteristics of the target audience, the determined engagement score for the combination of the keyword and each of the one or more features in association with the calculated average.

18. A system for suggesting alternative words for use in social media postings, the system comprising:
  at least one processor; and
  at least one non-transitory computer-readable storage medium storing instructions thereon that, when executed by the at least one processor, cause the system to:
  receive, from a client device, a draft of a social media post and an indication of a query word in the social media post to analyze for alternative suggestions;
  receive a plurality of characteristics of a target audience for the social media post;
  determine a predicted engagement score for the query word based on past performances of prior social media posts associated with a social media group having the plurality of characteristics within a social media system and including the query word and one or more features in common with the social media post;
  identify a context of the query word using disambiguation;
  identify one or more alternative words that have a similar meaning as the query word given the identified context of the query word;
  determine an engagement score relative to users of the social media system having the plurality of characteristics for each of the one or more alternative words based on past performances of prior social media posts relative to the users of the social media system having the plurality of characteristics including the one or more alternative words and one or more features in common with the social media post by:
    for each alternative word in the one or more alternative words: identifying, within an engagement model associated with the users of the social media system having the plurality of characteristics of the target audience, one or more engagement scores associated with the alternative word and each of the one or more features, and
    averaging the identified one or more engagement scores associated with the alternative word into an engagement score relative to the users for the alternative word; and
  provide each of the one or more alternative words having an engagement score higher than the predicted engagement score for the query word to the client device.

19. The system as recited in claim 18,
  wherein the instructions that, when executed by the at least one processor, cause the system to provide each of the one or more alternative words having an engagement score higher than the predicted engagement score for the query word to the client device further provide each of the one or more alternative words in a selectable list; and
  further comprising instructions that, when executed by the at least one processor, cause the system to rank the selectable list based on the predicted engagement score for each of the one or more alternative words.

20. The method as recited in claim 8, wherein providing the at least one alternative work comprises providing a top threshold number of ranked alternative words based on the predicted engagement scores in the selectable list.

* * * * *